(12) United States Patent
Mizutani et al.

(10) Patent No.: US 6,351,962 B1
(45) Date of Patent: Mar. 5, 2002

(54) COCKPIT MODULE ASSEMBLY INCLUDING AIR CONDITIONER FOR VEHICLE

(75) Inventors: Satoshi Mizutani, Nagoya; Kazushi Shikata; Shigeo Numazawa, both of Kariya; Tomohiro Kamiya, Takahama, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/722,958

(22) Filed: Nov. 27, 2000

(30) Foreign Application Priority Data

| Dec. 6, 1999 | (JP) | ............................................. 11-346376 |
| Jan. 13, 2000 | (JP) | ................................................ 2000-009964 |
| Sep. 22, 2000 | (JP) | ................................................ 2000-288619 |

(51) Int. Cl.$^7$ ........................... B60H 1/32; F25D 21/14; B62D 25/14; B60K 37/00
(52) U.S. Cl. ............................. 62/244; 62/285; 246/70; 246/72; 180/90
(58) Field of Search ......................... 62/285, 272, 298, 62/244; 296/70, 72; 180/90

(56) References Cited

U.S. PATENT DOCUMENTS 4,365,826 A * 12/1982 Iriyama ....................... 280/779
5,324,203 A * 6/1994 Sano et al. ..................... 439/34
5,707,100 A * 1/1998 Suyama et al. .............. 296/192
6,073,987 A * 6/2000 Lindberg et al. .............. 296/70
6,119,060 A * 9/2000 Takayama et al. ............. 701/36

FOREIGN PATENT DOCUMENTS

EP  842805 A2 * 5/1998

* cited by examiner

Primary Examiner—William C. Doerrles
(74) Attorney, Agent, or Firm—Harness, Dickey & Pierce, PLC

(57) ABSTRACT

In a vehicle cockpit module assembly having at least an air conditioner disposed inside a dashboard, a protrusion piece for determining an arrangement position of an air-conditioning unit of the air conditioner within the dashboard is provided at the air-conditioning unit. A front load support portion for supporting a front side load of the air-conditioning unit is constructed by a drain pipe of the air-conditioning unit, and a rear load support portion for supporting a rear side load of the air-conditioning unit is constructed by rear foot ducts of the air-conditioning unit. Accordingly, in the cockpit module assembly, the air conditioner can be stably supported in the vehicle.

36 Claims, 18 Drawing Sheets

COCKPIT MODULE ASSEMBLY INCLUDING AIR CONDITIONER FOR VEHICLE

CROSS-REFERENCE TO RELATED APPLICATION

This application is related to and claims priority from Japanese Patent Applications No. Hei. 11-346376 filed on Dec. 6, 1999, No. 2000-9964 filed on Jan. 13, 2000, and No. 2000-288619 filed on Sep. 22, 2000, the contents of which are hereby incorporated by reference.

BACKGROUND OF THE INVENTION

1. Field of the Invention

The present invention relates to a cockpit module assembly for a vehicle, in which plural components such as an air conditioner are readily assembled as a single assembling body to a portion inside a dashboard of the vehicle.

2. Description of Related Art

In a conventional vehicle structure, a blower unit and an air-conditioning unit of an air conditioner are fixed to a strengthening rod extending in a vehicle right-left direction inside a dashboard, so that the blower unit and the air-conditioning unit are integrally assembled through the strengthening rod. Because the strengthening rod is generally disposed at a vehicle rear upper side of the air conditioner, the blower unit and the air-conditioning unit dangle unstably on the strengthening rod, and therefore, the air conditioner is readily vibrated due to a vehicle vibration.

Further, because a steering device is generally supported by the strengthening rod, vibration generated by the operation of the blower unit is readily transmitted to the steering device through the strengthening rod.

On the other hand, a center cluster, where plural components such as a radio, an audio device and an air-conditioning operation panel are gathered, is fixed to the strengthening rod at a center portion of the strengthening rod in the vehicle right-left direction using both relatively larger brackets. Therefore, the attachment structure for fixing the center cluster to the strengthening rod becomes complex.

SUMMARY OF THE INVENTION

In view of the foregoing problems, it is an object of the present invention to provide a vehicle cockpit module assembly in which an air conditioner can be accurately stably supported to a vehicle frame.

It is another object of the present invention to provide a vehicle cockpit module assembly which restricts a transmission of vibration generated by the operation of a blower unit to a steering device.

It is another object of the present invention to provide a vehicle cockpit module assembly in which an air conditioner can be readily assembled to a vehicle frame.

It is another object of the present invention to provide a vehicle cockpit module assembly in which an attachment structure for fixing a center cluster can be made simple with a reduced size.

According to the present invention, in a vehicle cockpit module assembly having at least an air conditioner disposed inside a dashboard, the air conditioner includes an air-conditioning unit having therein a heat exchanger for performing a heat exchange with air, a position determination portion is provided in the air-conditioning unit for determining an arrangement position of the air-conditioning unit inside the dashboard during an assembling state before being mounted on the vehicle, and first and second load support portions for supporting load of the air-conditioning unit are provided at a vehicle rear lower side and a vehicle front side of the air-conditioning unit, respectively, to be assembled to a vehicle frame during a vehicle mounting state after the assembling state. Accordingly, in the vehicle cockpit module assembly, the air-conditioning unit can be accurately and stably assembled to the vehicle frame using the position determination portion.

Because the first and second load support portions are provided at the vehicle rear lower side and the vehicle front side of the air-conditioning unit to be assembled to the vehicle frame, the first load support portion of the air-conditioning unit can be respectively directly supported by a floorboard of the vehicle frame. Further, the position determination of the air-conditioning unit is performed during the assembling state before the vehicle mounting state by the position determination portion, and the first support portion is provided at the rear lower side of the air-conditioning unit, which does not interfere with the other components within the dashboard. Therefore, the air conditioner can be readily assembled to the vehicle frame. Because both the first and second support portions are provided in the air-conditioning unit, the supporting state of the air-conditioning unit to the vehicle frame can be maintained even when the position determination state of the position determination portion to the vehicle frame is released in the vehicle mounting state.

Generally, the position determination portion is set at a predetermined position of a strengthening member to which a steering device is attached. Therefore, when the position determination state of the position determination portion relative to the strengthening member is released in the vehicle mounting state, it can prevent a transmission of vibration generated by the operation of the blower unit to the steering device through the air-conditioning unit and the strengthening member.

Preferably, the first load support portion is constructed by a rear air duct through which air is blown toward a rear seat side of a passenger compartment. More preferably, the second load support portion is constructed by a drain pipe through which condensed water generated by a cooling heat exchanger of the air-conditioning unit is discharged. Accordingly, the first and second load support portions can be readily simply provided in the air-conditioning unit, and the load of the air-conditioning unit can be stably supported by the first and second load support portions.

Preferably, the air-conditioning unit is disposed inside the dashboard at an approximate center position in a vehicle right-left direction, the air-conditioning unit has an air-conditioning case for defining an air passage through which air flows into the passenger compartment, at least a part of the air-conditioning unit is fixed to the dashboard, and the air-conditioning case has a fixing portion at a vehicle rear side position for fixing a center cluster in which plural electrical components are integrally gathered. The plural components are a radio, an audio device and the like, for example. Because the fixing portion for fixing the center cluster is provided in the air-conditioning case on the vehicle rear side, the fixing portion can be readily simply formed at a position adjacent to the center cluster without a specific bracket for the center cluster. Accordingly, the attachment structure of the center cluster can be made simple with a reduced size.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
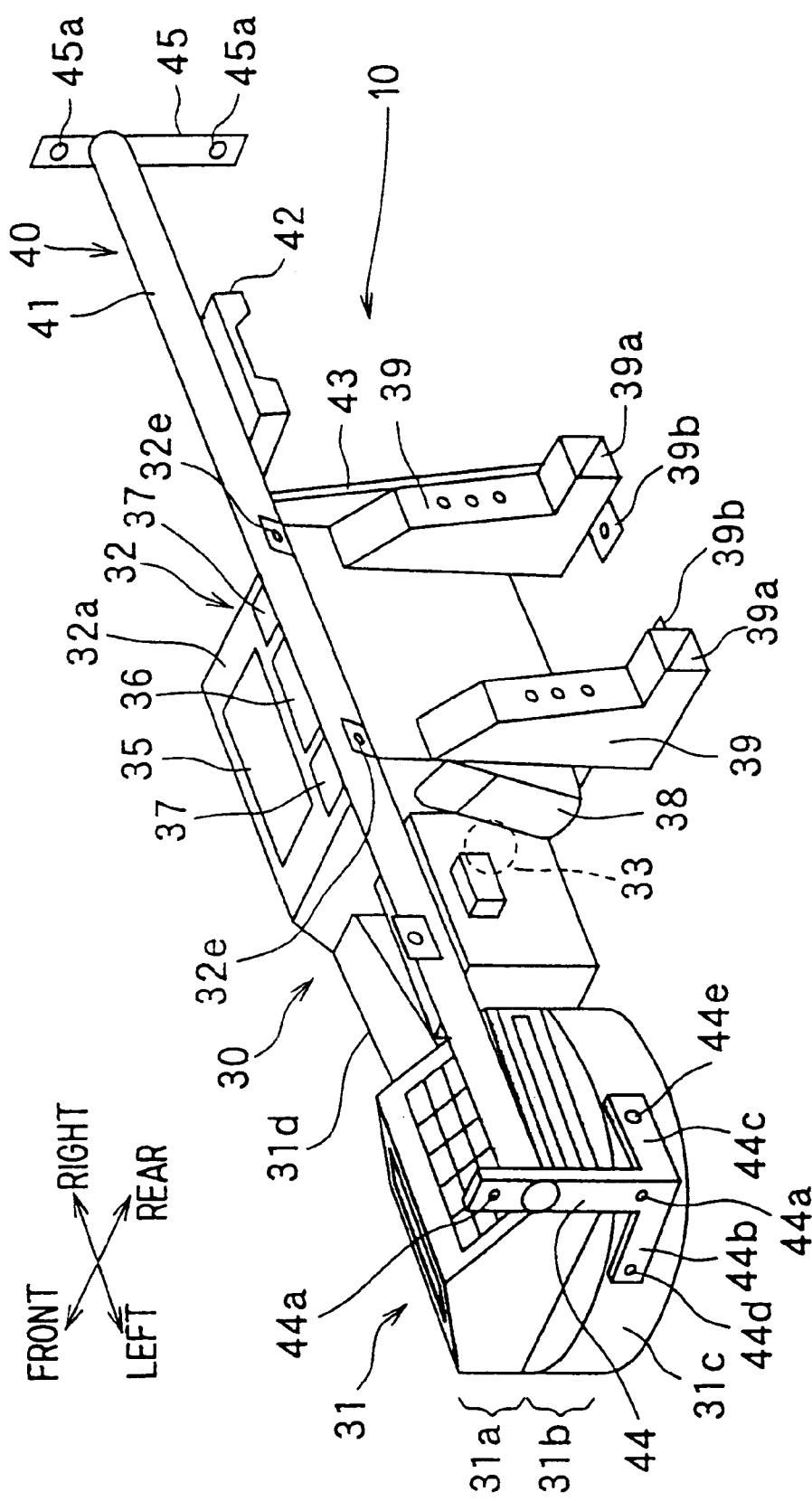
FIG. 1 is a perspective view showing a main part of a vehicle cockpit module assembly according to a first preferred embodiment of the present invention.
Figure 2:
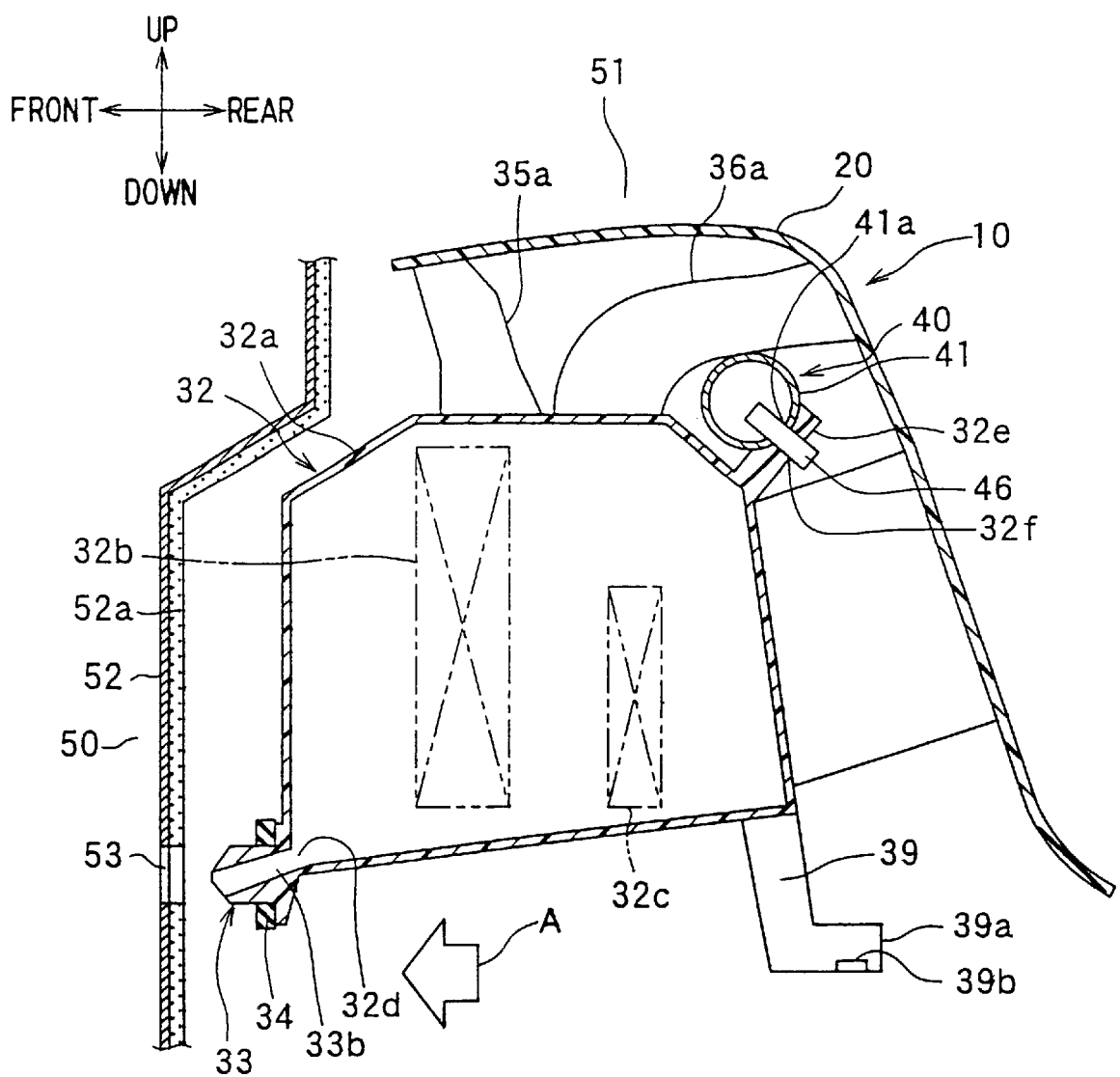
FIG. 2 is a schematic sectional view of an air-conditioning unit, showing an assembling direction of the cockpit module assembly on the vehicle, according to the first embodiment.

A first preferred embodiment of the present invention will be now described with reference to FIGS. 1–5. FIG. 1 shows an assembling state of a main portion of a cockpit module assembly 10 within a vehicle. In the first embodiment, the cockpit module assembly 10 is mounted on the vehicle to correspond to the arrangement in a vehicle up-down direction, in a vehicle right-left direction and in a vehicle front-rear direction, as shown in FIGS. 1, 2 and 5.

The cockpit module assembly 10 is constructed by assembling plural components such as an air conditioner 30 inside a dashboard 20. In the first embodiment, the cockpit module assembly indicates not only an integrally assembled structure inside the dashboard 20 but also a mounting structure of the integrally assembled structure using suitable jigs on the vehicle.

In the first embodiment, the present invention is typically applied to a vehicle having a right steering wheel. As shown in FIG. 1, the air conditioner 30 includes a blower unit 31 disposed at a front passenger's seat side (i.e., vehicle left side), and an air-conditioning unit 32 disposed at an approximate center position in the vehicle right-left direction.

The blower unit 31 includes an inside/outside air switching box 31a, and a centrifugal blower 31b disposed at a lower side of the inside/outside air switching box 31a. Inside air (i.e., air inside a passenger compartment 51) and blower unit 31 and the air-conditioning unit 32, as shown in FIGS. 1 and 2. The strengthening member 40 has a strengthening rod 41 extending in the vehicle right-left direction. Here, the strengthening rod 41 includes a solid rod and a pipe-like member with a hollow hole, and can be formed into a round-shape, a rectangular shape or the like in cross-section. Generally, the strengthening member 40 is made of a metal such as an iron group metal.

The air-conditioning unit 32 adjusts temperature of air blown into the passenger compartment 51 by the blower unit 31 so that conditioned air blown into the passenger compartment 51 is obtained. The air-conditioning unit 32 includes an air-conditioning case 32a connected to the air-blowing duct 31d. The air-conditioning case 32a is made of resin, and is provided to accommodate therein plural air-conditioning components. That is, the air-conditioning components includes an evaporator 32b for cooling air passing therethrough, a heater core 32c for heating air passing therethrough, an air mixing door (not shown) for controlling temperature of air to be blown into the passenger compartment 51, and a mode switching door (not shown) for switching an air outlet mode.

As shown in FIG. 2, the evaporator 32b is disposed so that air from the air-blowing duct 31a of the blower unit 31 flows into a front surface of the evaporator 32b. A drain port 32d through which condensed water generated by the evaporator 32b is discharged is opened in a bottom surface of the air-conditioning case 32a, and a drain pipe 33 for discharging the condensed water from the drain port 32d to an outside is integrally formed with a bottom side portion of the air-conditioning case 32a.

The drain pipe 33 protrudes from the bottom side portion of the air-conditioning case 32a approximately horizontally toward a vehicle front side. In the first embodiment, the drain pipe 33 is also used as a load supporting portion for supporting the load of the air-conditioning unit 32 at a vehicle front side. That is, the front load support portion of the air-conditioning unit 32 is constructed by the drain pipe 33.

Figure 3:
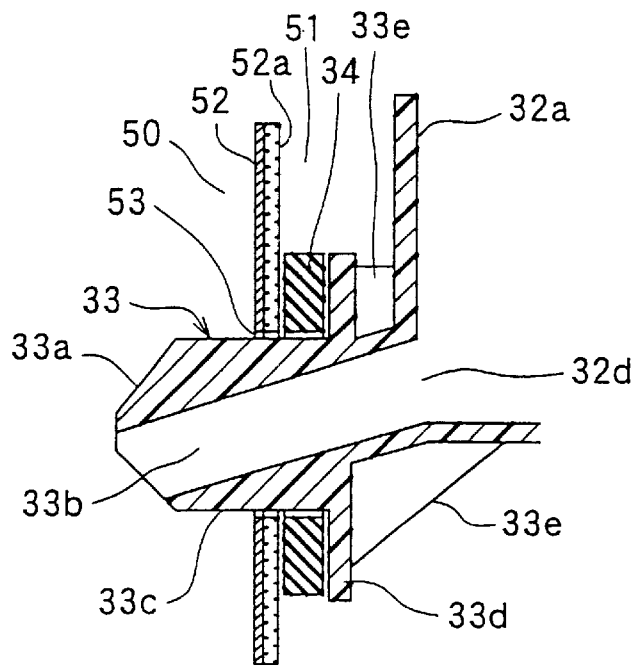
FIG. 3 is an enlarged sectional view showing a drain pipe of the air-conditioning unit according to the first embodiment.

An engine compartment 50 and the passenger compartment 51 are partitioned by a partition wall (fire wall) 52 of the vehicle as shown in FIG. 2. A through hole 53, into which the drain pipe 33 is inserted horizontally, is opened approximately horizontally in the partition wall 52. The drain pipe 33 is directly inserted into the through hole 53 so that a top end 33a of the drain pipe 33 protrudes into the engine compartment 50. As shown in FIG. 3, the top end 33a has a taped shape, and therefore, the drain pipe 53 is readily inserted into the through hole 53. A sound-absorbing material 52a is bonded onto a surface of the partition wall 52 at a side of the passenger compartment 51.

Figure 4:
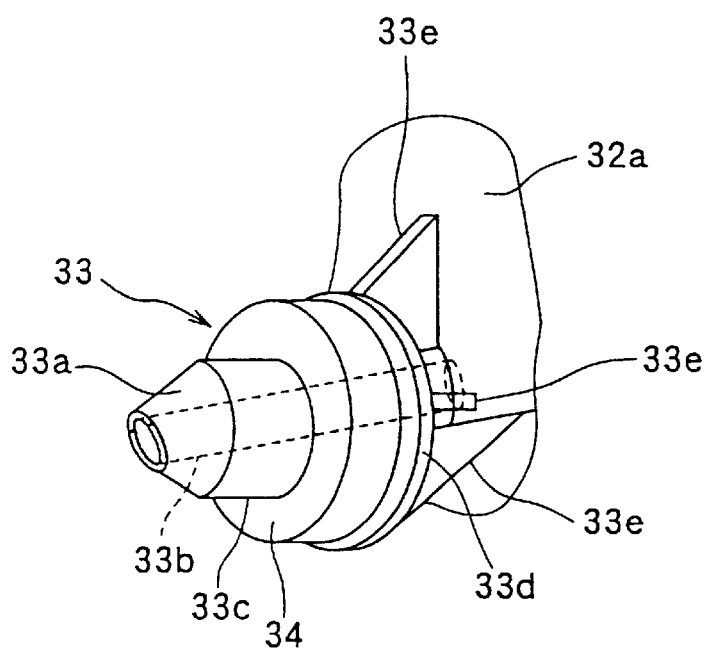
FIG. 4 is a perspective view of the drain pipe of the air-conditioning unit according to the first embodiment.
Figure 5:
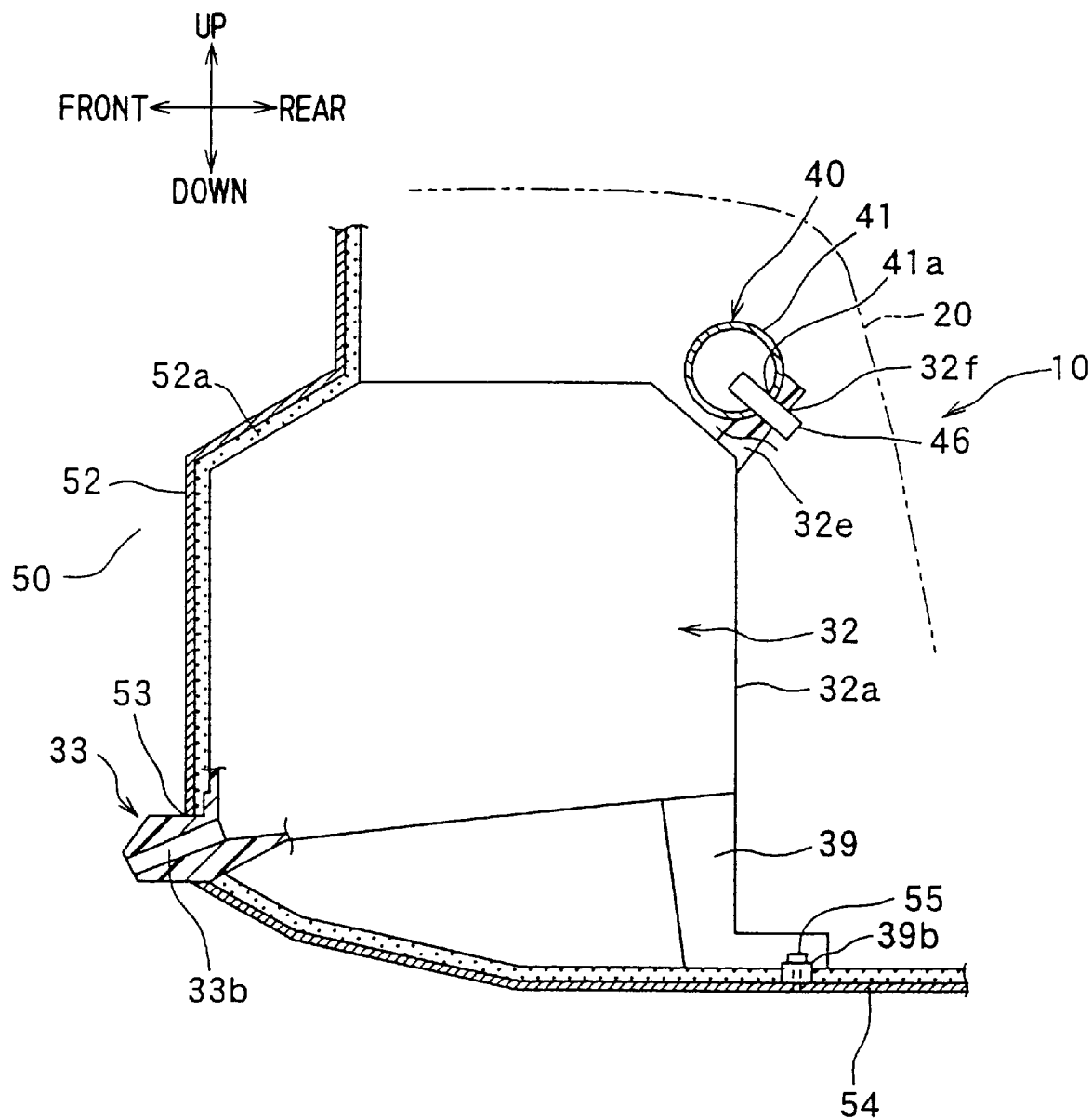
FIG. 5 is a schematic sectional view showing the cockpit module assembly after being mounted on the vehicle according to the first embodiment.

As shown in FIGS. 3 and 4, because a drain passage 33b tilted downwardly from the drain port 32d is provided within the drain pipe 33, condensed water generated by the evaporator 32b can be discharged to a lower side of the engine compartment 50 through the drain passage 33b.

Even when the drain passage 33b is tilted downwardly, because an outer peripheral surface 33c of the drain pipe 33 extends in the horizontal direction, the load of the air-conditioning unit 32 at the vehicle front side can be sufficiently supported by the insertion engagement between the outer peripheral surface 33c of the drain pipe 33 and the through hole 53 of the partition wall 52.

A wall portion of the drain pipe 33, defining the outer peripheral surface 33c and the drain passage 33b, is set to have a strength necessary for sufficiently supporting the load of the air-conditioning unit 32. For improving the draining performance of condensed water, a tilted angle of the drain passage 33b is set to be equal to or larger than 5°.

Further, a circular-plate like flange 33d is formed to protrude radial outside from a base portion (i.e., the connection portion between the drain pipe 33 and the drain port 32d) of the peripheral surface 33c of the drain pipe 33.

A packing 34 made of an elastic material such as a rubber is formed to be inserted between the flange 33d and the sound-absorbing material 52a of the partition wall 52 so that a clearance between the through hole 53 and the drain pipe 33 can be tightly closed. A reinforcement rib 33e is formed between the flange 33d and the air-conditioning case 32a. In the first embodiment, the sound-absorbing material 52a attached to the partition wall 52 may be formed to be also used as a seal member for sealing the clearance around the through hole 53. In this case, the packing 34 may be unnecessary.

As shown in FIG. 1, in an upper front surface of the air-conditioning case 32a of the air-conditioning unit 32, a defroster opening 35 is provided. Further, a center face opening 36 is provided at a vehicle rear side of the defroster opening 35, and right and left side face openings 37 are provided at both right and left sides of the center face opening 36, in the upper surface of the air-conditioning case 32a. The defroster opening 35 is connected to a defroster duct 35a shown in FIG. 2, so that conditioned air is blown toward an inner surface of a windshield from a defroster air outlet provided at a top end of the defroster duct 35a. The center face opening 36 is connected to a center face duct 36a shown in FIG. 2, so that conditioned air is blown toward the upper side of a passenger in the passenger compartment 51 from a center face air outlet provided at a top end of the center face duct 36a.

Further, the right and left side face openings 37 are connected to right and left side face ducts (not shown), so that cool air is blown toward the side upper side of the passenger in the passenger compartment during a cooling operation, and warm air is blown toward a side windshield of the vehicle during a heating operation.

Further, as shown in FIG. 1, right and left front foot air ducts 38 shown in FIG. 1 are integrally formed with the air-conditioning case 32a at right and left side surfaces. The front foot air ducts 38 are disposed so that conditioned air is blown toward the front foot area of the passenger from top ends of the front foot ducts 39. As shown in FIG. 1, both right and left rear foot ducts 39 are disposed to extend from a rear side surface of the air-conditioning case 32a downwardly. Top ends 39a of the rear foot ducts 39 are further connected to rear connection ducts extending to a rear seat side in the passenger compartment 51, so that conditioned air is blown toward the lower side of a passenger on the rear seat from top ends of the rear foot connection ducts.

As shown in FIG. 1, right and left attachment pieces 39b are integrally formed with bottom portions of the right and left rear foot ducts 39, respectively. The attachment pieces 39b are attached to a floorboard 54, as shown in FIG. 5. Accordingly, the rear foot ducts 39 are used as a load supporting member for supporting a rear bottom portion of the air-conditioning unit 32 onto the floorboard 54. For example, the attachment pieces 39b are attached to a center tunnel portion of the floorboard 54 at a center portion in the vehicle right-left direction by using a fastening member 55 such as a screw.

On the other hand, a strengthening member 40 is disposed inside the dashboard 20 to extend in the vehicle right-left direction at a vehicle rear upper side of the blower unit 31 and the air-conditioning unit 32, as shown in FIGS. 1 and 2. The strengthening member 40 has a strengthening rod 41 extending in the vehicle right-left direction. Here, the strengthening rod 41 include a solid rod and a pipe-like member with a hallow hole, and can be formed into a round-shape, a rectangular shape or the like in cross-section. Generally, the strengthening member 40 is made of a metal such as an iron group metal.

A steering device is generally fixed to and is supported in the strengthening member 40. In the vehicle having the right steering, a support stay 42 for supporting the steering device is fixed to the strengthening rod 41 at a position near a right end of the strengthening rod 41 by welding.

A reinforcement support stay 43 is disposed in the strengthening rod 41 along a right side surface of the air-conditioning unit 32 at a position separated from the support stay 42 to a left side by a predetermined distance. One end of the reinforcement support stay 43 is fixed to the strengthening rod 41 by welding, for example, and the other end thereof is fixed to the floorboard. Accordingly, by the reinforcement support stay 43, the portion of the strengthening member 40 around the support stay 42 is reinforced.

Side brackets 44, 45 are fixed to both right and left side ends of the strengthening rod 41 of the strengthening member 40 by welding, for example. Each of the side brackets 44, 45 is formed into a plate like extending in the vehicle up-down direction. The side brackets 44, 45 have attachment holes 44a, 45a. Screws are inserted into the attachment holes 44a, 45a so that the side brackets 44, 45 are fixed to a vehicle frame. In the first embodiment, the strengthening member 40 is fixed to the vehicle frame by the side brackets 44, 45.

Further, both attachment pieces 44b, 44c are integrally formed with a lower end of the left side bracket 44. The attachment pieces 44b, 44c are disposed along an outer surface of the fan case 31c of the blower 31b. By inserting screw members into the attachment holes 44d, 45e of the attachment pieces 44b, 44c, the fan case 31c of the blower 31b is tightly fastened to the attachment pieces 44b, 44c. That is, the attachment pieces 44b, 44c are used as a load support portion for fixing the fan case 31c to the side bracket 44.

An additional load support portion for fixing the blower unit 31 to the partition wall 52 or the vehicle side frame can be added. In this case, the blower unit 31 can be further stably supported and fixed to the vehicle frame.

On the other hand, both right and left protrusion pieces 32e (i.e., position determination portion) for determining an attachment position of the air-conditioning unit 32 inside the dashboard 20 are integrally formed with the air-conditioning case 32a of the air-conditioning unit 32 at an upper rear side. The both right and left protrusion pieces 32e are used for determining the attachment position of the air-conditioning unit 32 in an assembling state of a cockpit module assembly before being mounted on the vehicle.

Specifically, as shown in FIGS. 2 and 5, positioning holes 41a for the attachment position of protrusion pieces 32e are opened at predetermined positions corresponding to the arrangement positions of the protrusion pieces 32e in the strengthening rod 41 of the strengthening member 40, and positioning holes 32f are also provided in the protrusion pieces 32e to correspond to the positioning holes 41a. Further, insertion members 46 such as pins are inserted into both corresponding positioning holes 41a and 32f, so that the arrangement position of the air-conditioning unit 32 relative to the strengthening member 40 is set.

Next, mounting steps of the cockpit module assembly 10 on the vehicle will be now described. First, assembling operation of the cockpit module assembly 10 is performed. Specifically, the fan case 31c of the blower unit 31 is attached to the attachment pieces 44b, 44c of the side bracket 44 of the strengthening member 40 by using a fastening member such as a screw. Further, the protrusion pieces 32e provided at the upper portion of the air-conditioning unit 32 are assembled to the predetermined positions of the strengthening rod 41 of the strengthening member 40 by inserting the insertion member 46 into both the corresponding positioning holes 32f and 41a. FIG. 1 shows the assembled state where the blower unit 31 and the air-conditioning unit 32 of the air conditioner 30 are assembled to the strengthening member 40 at predetermined positions.

Next, the blower unit 31, the air-conditioning unit 32, the strengthening member 40 and the other components are accommodated inside the dashboard 20, and are integrally assembled with the dashboard 20 to construct the cockpit module assembly 10 mounted on the vehicle.

The strengthening member 40 and the dashboard 20 can be integrated by various methods. For example, an attachment portion is provided to the side brackets 44, 45 of the strengthening member 40, and the strengthening member 40 can be assembled to the dashboard 20 using the attachment portion.

Further, when a steering housing (not shown) of the steering device in an axial direction is supported and fixed to the support stay 42 for the steering device, the steering device of the vehicle can be also integrated to the cockpit module assembly 10.

In this assembly state in FIG. 1, only the protrusion pieces 32e of the air-conditioning unit 32 are fixed to the strengthening member 40 at a predetermined arrangement position of the air-conditioning unit 32 relative to the strengthening member 40. Therefore, the strength for supporting the load of the air-conditioning unit 32 may be insufficient in the assembling state. In this case, an assembling jig is disposed at a lower side of the air-conditioning unit 32 so that the load of the air-conditioning unit 32 can be temporarily supported in the assembling state.

Next, operation for mounting the cockpit module assembly 10 on the vehicle will be now described. As shown by arrow A in FIG. 2, all of integrated the cockpit module assembly 10 is moved toward the partition wall 52 within the vehicle compartment 51. At this time, the drain pipe 33 provided at the vehicle front lower side of the air-conditioning case 32a of the air-conditioning unit 32 is horizontally inserted into the through hole 53 of the partition wall 52. Therefore, the front lower side of the air-conditioning unit 32 is supported by the horizontal insertion part of the drain pipe 33 inserted into the through hole 53.

Next, while the engagement state between the drain pipe 33 and the through hole 53 of the partition wall 52 is maintained, the arrangement position of the strengthening member 40 is determined so that the attachments holes 44a, 45a of the right and left side brackets 44, 45 of the strengthening member 40 correspond to attachment holes provided in the side wall of the vehicle frame, respectively. That is, fastening members such as bolts are inserted and fastened into the attachment holes 44a, 45a of the side brackets 44, 45 and the attachment holes in the side wall of the vehicle frame, so that the side brackets 44, 45 of the strengthening member 40 are fastened and fixed to the right and left side walls of the vehicle frame.

Further, both the attachment pieces 39b provided at the bottom portion of the rear foot ducts 29 of the air-conditioning unit 32 are fastened and fixed to the center tunnel portion of the floorboard 54 by the fastening member 55. The dashboard 20 is also fixed to the vehicle frame at predetermined positions by a screw and the like.

The insertion member 46 for determining the arrangement position of the air-conditioning unit 32 within the dashboard 20 is necessary for the assembling of the cockpit module assembly 10 in the assembling state. However, after the cockpit module assembly 10 is mounted on the vehicle, because the load of the air-conditioning unit 32 can be sufficiently supported by the insertion of the drain pipe 33 into the through hole 53 and by the attachment pieces 39b of the rear foot duct 39, the insertion member 46 can be released from the positioning holes 32f and 41a after the assembling state.

Even when the insertion member 46 is removed from the holes 41a, 32f, the cockpit module assembly 10 can be mounted on the vehicle. In this case, the air-conditioning unit 32 can be deformed relative to the strengthening member 40. Accordingly, even when arrangement position of the air-conditioning unit 32 is offset due to the production dimension difference, the offset arrangement position can be absorbed by a relative displacement between the air-conditioning unit 32 and the strengthening member 40 during the vehicle mounting state. Therefore, even in this case, the drain pipe 33 of the air-conditioning unit 32 can be readily inserted into the through hole 53 of the partition wall 52, and the attachment pieces 39b of the rear foot ducts 39 can be readily fastened to the floorboard 54.

As described above, according to the first embodiment, because the dashboard 20 and the components around the dashboard 20 are temporarily integrated in the assembling state as the cockpit module assembly 10, the mounting operation of the dashboard 20 and the components around the dashboard 20 can be readily performed at a time.

Further, according to the first embodiment, when the cockpit module assembly 10 is mounted on the vehicle, the following effects can be obtained.

During vehicle mounting state of the cockpit module assembly 10, the load of the air-conditioning unit 32 can be directly supported by the vehicle frame at the engagement portion between the drain pipe 33 and the through hole 53 of the partition wall 52 on a vehicle front side, and at the attachment pieces 39b of the rear foot ducts 39 on the vehicle rear side. Therefore, the load of the air-conditioning unit 32 can be stably supported from the lower side at both the vehicle front and rear sides. Accordingly, even when vibration is caused during a vehicle traveling, the air-conditioning unit 32 is not vibrated.

The drain pipe 33 generally provided in the air-conditioning unit 32 is effectively used as the load support portion of the air-conditioning unit 32 on the vehicle front side, and the rear foot ducts 39 are used as the load support portion of the air-conditioning unit 32 on the vehicle rear side. Therefore, the load support structure of the air-conditioning unit 32 can be made simple.

During the vehicle mounting state of the cockpit module assembly 10, the positioning state of the air-conditioning unit 32 relative to the strengthening member 40 can be released. Therefore, even when arrangement position of the air-conditioning unit 32 is offset due to the production dimension difference, the offset arrangement position can be absorbed by a relative displacement between the air-conditioning unit 32 and the strengthening member 40. Accordingly, the drain pipe 33 of the air-conditioning unit 32 can be readily inserted into the through hole 53 of the partition wall 52, and the attachment pieces 39b of the rear foot ducts 39 can be readily fastened to the floorboard 54 even in this case.

Generally, the vibration generated due to the operation of the blower unit 31 is transmitted to the steering device through the side bracket 44, the strengthening rod 41 and the support stay 42. However, in the first embodiment, because the side bracket 44 is tightly fixed to the vehicle frame, the side bracket 44 does not vibrate with the operation of the blower unit 31. Accordingly the transmission of the vibration due to the operation of the blower unit 31 can be effectively prevented.

Further, when the positioning state of the air-conditioning unit 32 relative to the strengthening member 40 is released, the vibration of the blower unit 31 is not transmitted to the steering device through the air-conditioning unit 32. Even when the positioning state of the air-conditioning unit 32 relative to the strengthening member 40 is maintained, because the insertion member 46 does not construct the load support structure of the air-conditioning unit 32, vibration transmission from the air-conditioning unit 32 to the steering device can be sufficiently reduced.

In the above-described first embodiment, the steering device is integrally assembled as a part of the cockpit module assembly 10 before being mounted on the vehicle. However, the steering device of the vehicle can be supported and fixed to the support stay 42 after the cockpit module assembly 10 is mounted on the vehicle.

Figure 6A:
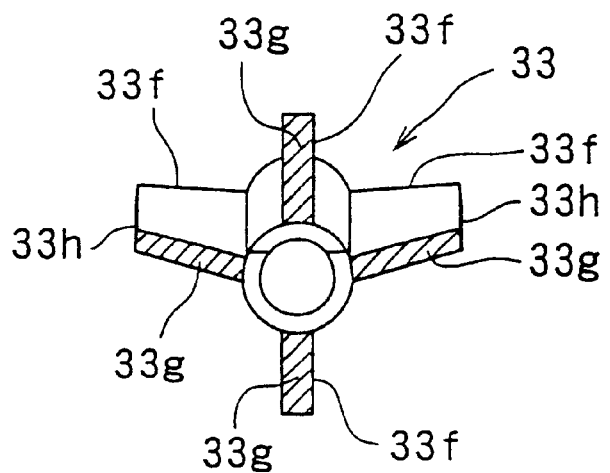
FIGS. 6A and 6B are top views each showing a drain pipe for an air-conditioning unit when being viewed from a top end side of the drain pipe, according to a second preferred embodiment of the present invention.
Figure 6B:
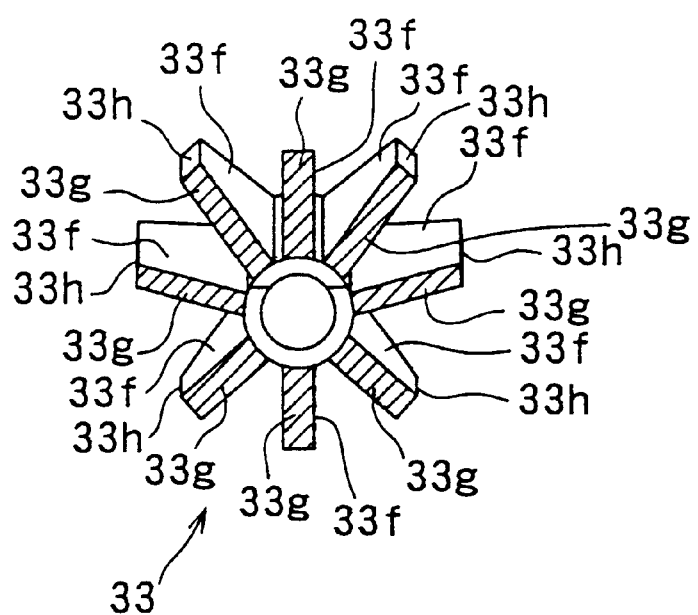

A second preferred embodiment of the present invention will be now described with reference to FIGS. 6A and 6B. FIGS. 6A and 6B correspond to views when being viewed from a left side of the drain pipe 33 in FIG. 4. In the above-described first embodiment, the top end 33a of the drain pipe 33 is formed into the tapered shape. However, in the second embodiment, instead of the top end described in the first embodiment, plural ribs 33f are formed in the drain pipe 33. For example, four ribs 33f are provided in FIG. 6A, and eight ribs 33f are provided in FIG. 6B.

As shown in FIGS. 6A and 6B, each rib 33f has a top taper surface 33g corresponding to the taped top end 33a of the first embodiment, and a parallel surface 33h corresponding to the outer peripheral surface 33c of the first embodiment. In each rib 33f, the parallel surface 33h is provided at an inner side from the top taper surface 33g.

Even when the drain pipe 33 has the shapes shown in FIGS. 6A, 6B, the assembling performance and load supporting performance described in the above-described first embodiment can be obtained because each rib 33f of the drain pipe 33 has the taper surface 33g and the parallel surface 33h. In addition, in the second embodiment, the drain pipe 33 can be formed by a relatively small resin material, while being accurately molded by the resin.

In the second embodiment, the other portions are similar to those of the abode-described first embodiment.

Figure 7:
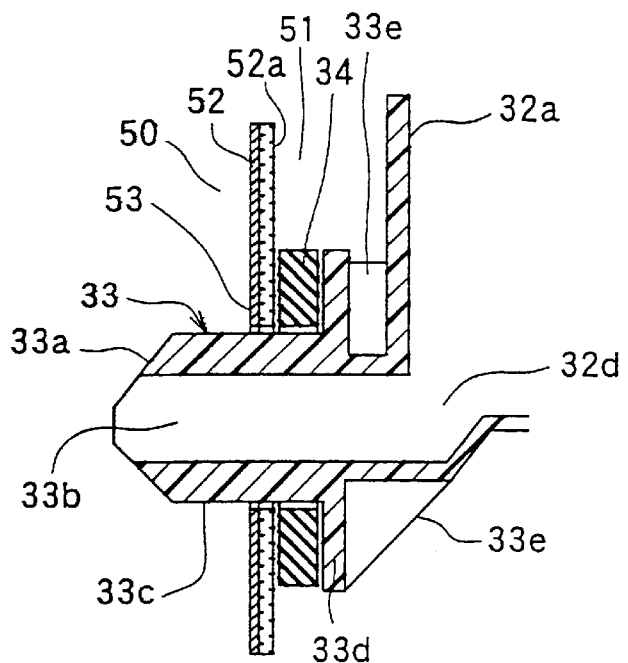
FIG. 7 is an enlarged sectional view showing a drain pipe of an air-conditioning unit according to a third preferred embodiment of the present invention.

A third preferred embodiment of the present invention will be now described with reference to FIG. 7. In the third embodiment, an inner bottom surface of the drain pipe 33 defining the drain passage 33b is set at a lower position lower than of an inner bottom surface of the air-conditioning case 32a, and the drain passage 33b is provided to extend in the horizontal direction. In this case, the drain passage 33b of the drain pipe 33 is parallel to the outer peripheral surface 33c extending horizontally, the drain pipe 33 is readily formed. In the third embodiment, the other portions are similar to those of the above-described first embodiment.

Figure 8:
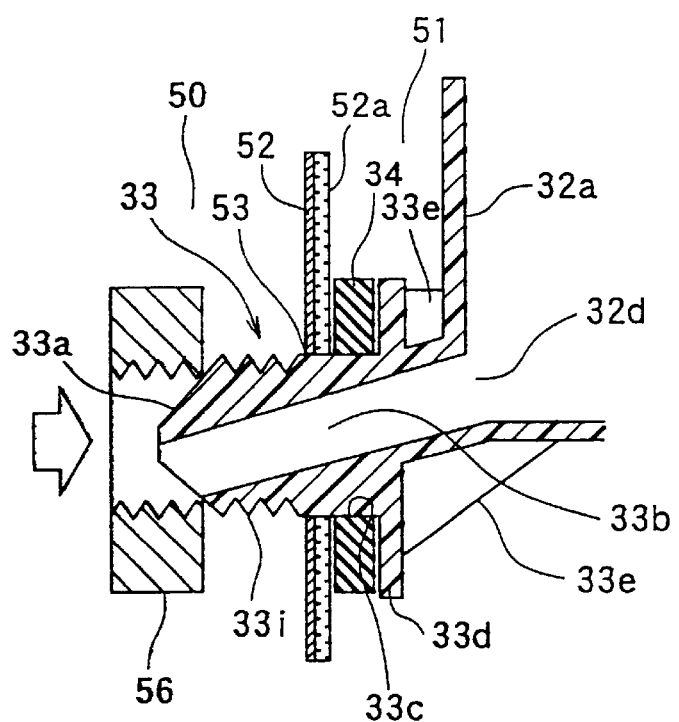
FIG. 8 is an enlarged sectional view showing a drain pipe of an air-conditioning unit according to a fourth preferred embodiment of the present invention.

A fourth preferred embodiment of the present invention will be now described with reference to FIG. 8. In the above-described first embodiment, the outer peripheral surface 33c extending in the horizontal direction is inserted into the through hole 53 to be engaged with the through hole 53 of the partition wall 52. In the fourth embodiment, a male screw 33i is provided at a top end side of the outer peripheral surface 33c of the drain pipe 33 to protrude into the engine compartment 50. A nut 56 is screw-fastened to the male screw 33i from the engine compartment 50 after the drain pipe 33 is inserted into the through hole 53, so that the drain pipe 33, that is, the front lower side portion of the air-conditioning unit 32, is tightly fastened to the partition wall 52. In the fourth embodiment, the other portions are similar to those of the above-described first embodiment.

Figure 9:
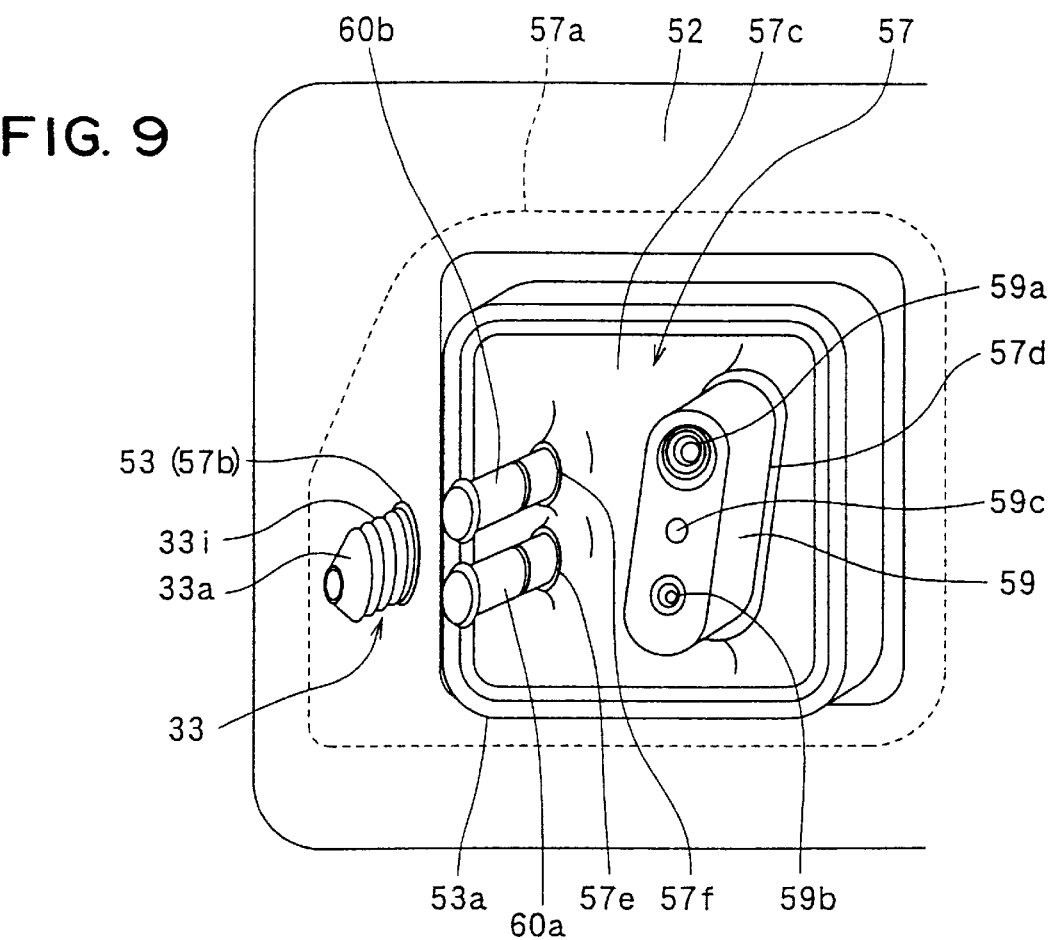
FIG. 9 is a partially perspective view showing an elastic seal member on a passenger compartment side in an assembling structure of a vehicle cockpit module assembly to a partition wall, according to a fifth preferred embodiment of the present invention.
Figure 10:
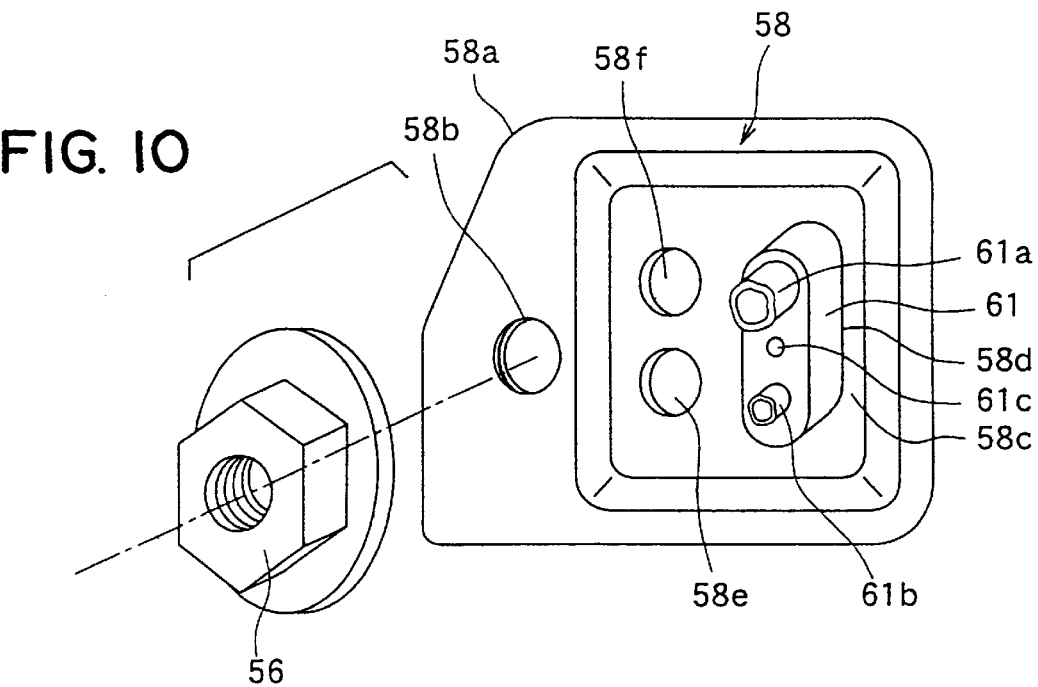
FIG. 10 is an exploded perspective view showing an elastic seal member on an engine compartment side in the assembling structure of the vehicle cockpit module assembly to the partition wall, according to the fifth embodiment.

A fifth preferred embodiment of the present invention will be now described with reference to FIGS. 9 and 10. In the fifth embodiment, the drain pipe 33, a refrigerant pipe of the evaporator 32b and a hot water pipe of the heater core 32c are fixed to the partition wall 52 to be sealed relative to the partition wall 52 by common elastic seal members 57, 58. The drain pipe 33 is formed into a shape similar to that of the above-described fourth embodiment.

In addition to the circular through hole 53 through which the drain pipe 33 is inserted, a through hole 53a approximately having a rectangular shape is opened in the partition wall 52 at a side of the through hole 53 in the vehicle right-left direction. Both the elastic seal members 57, 58 are made of an elastic material such as a hard rubber. The elastic seal member 57 includes a base plate portion 57a which has a surface area larger than an area where both the through holes 53 and 53a are formed. A circular through hole 57b through which the drain pipe 33 penetrates is opened in the base plate portion 57a of the elastic seal member 57.

Further, a pipe insertion portion 57c protruding from the base plate portion 57a into the engine compartment 50 by a predetermined height dimension is formed in the elastic seal member 57. The seal member 57 is attached to a surface of the partition wall 52 on the side of the passenger compartment, so that the pipe insertion portion 57c protrudes into the engine compartment 50 through the rectangular through hole 53a provided in the partition wall 52.

An elliptical through hole 57d, through which a refrigerant joint pipe 59 for the evaporator 32b penetrates, and both round through holes 57e, 57f, through which hot water pipes 60a, 60b of the heater core 32c penetrate, are opened in the pipe insertion portion 57c of the elastic seal member 57. The refrigerant pipe joint 59 has therein a pipe hole 59a for a low-pressure refrigerant pipe, a pipe hole 59b for a high-pressure refrigerant pipe, and an attachment hole 59c for attaching the refrigerant pipe joint 59.

On the other hand, the elastic seal member 58 is attached to a surface of the partition wall 52 on the side of the engine compartment 50. The elastic seal member 58 has a base plate portion 58a having a shape and an area approximately equal to those of the base plat portion 57a of the elastic seal member 57. A circular through hole 58b through which the drain pipe 33 penetrates is opened in the base plate portion 58a of the elastic seal member 58. Further, a pipe insertion portion 58c having a recess portion for covering the protruded pipe insertion portion 57c is integrally formed with the base plate portion 58a, in the elastic seal member 58. The pipe insertion portion 58c has therein an elliptical through hole 58d through which a refrigerant pipe joint 61 on the side of the engine compartment 50 penetrates, and two round through holes 58e, 58f through which the hot water pipes 60a, 60b of the heater core 32c penetrate. A low-pressure refrigerant pipe 61a and a high-pressure refrigerant pipe 61b are connected to the refrigerant pipe joint 61. An attachment hole 61c is provided in the refrigerant pipe joint 61 between both the refrigerant pipes 61a, 61b.

When a cockpit module assembly of the fifth embodiment is mounted on the vehicle, while the elastic seal member 57 is assembled to the partition wall 52 from the side of the passenger compartment, the drain pipe 33, the refrigerant pipe joint 59 of the evaporator 32b and hot water pipes 60a, 60b of the heater core 32c penetrate through the through holes of the elastic seal member 57 and the partition wall 52 to protrude into the engine compartment 50. Thereafter, the elastic seal member 58 is assembled to the partition wall 52 from the side of the engine compartment, so that the drain pipe 33 and the hot water pipes 60a, 60b penetrate through the through holes 58b, 58e, 58f. Next, drain pipe 33 is fastened to the partition wall 52 through both the elastic seal member 57, 58 by using a nut 56.

Further, the refrigerant pipe joint 61 on the side of the engine compartment 50 and the refrigerant pipe joint 59 for the evaporator 32b are tightly fastened and fixed by screw members (not shown) fastening into the attachment holes 59c, 61c. Accordingly, the refrigerant pipes on the side of the passenger compartment 51 and the refrigerant pipes on the side of the engine compartment 50 are connected.

Because the hot water pipes 60a, 60b of the heater core 32c protrudes into the engine compartment 50, the hot water pipes 60a, 60b can be readily connected to a hot water pipe (not shown) on the side of the engine compartment 51, within the engine compartment 50. In the fifth embodiment, the other portions are similar to those of the above-described first embodiment.

Figure 11:
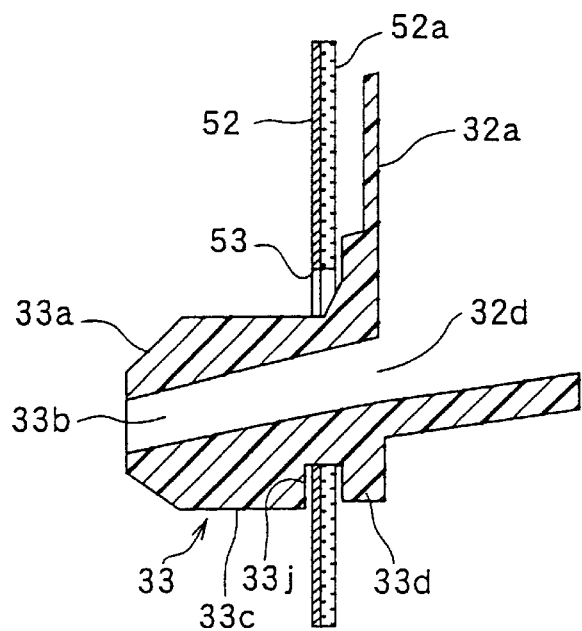
FIG. 11 is a sectional view showing a drain pipe of an air-conditioning unit according to a sixth preferred embodiment of the present invention.

A sixth preferred embodiment of the present invention will be now described with reference to FIG. 11. In the above-described fourth and fifth embodiments, the drain pipe 33 is tightly fastened to the partition wall 52 by using the screw members (e.g., the male screw 33i, nut 56). In the sixth embodiment, an engagement recess 33j is provided in the outer peripheral surface 33c of the drain pipe 33 to be engaged with a peripheral portion of the through hole 53 of the partition wall 52.

Specifically, the engagement recess 33j is provided in a lower side portion of the drain pipe 33, adjacent to the flange 33d. After the top end side of the outer peripheral portion 33c of the drain pipe 33 protrudes into the engine compartment 50 from the through hole 53, the engagement recess 33j engages with the lower side peripheral portion of the through hole 53 of the partition wall 52. Accordingly, the drain pipe 33 of the air-conditioning unit 32 can be engaged with the partition wall 52 without using an additional fastening member.

In the sixth embodiment, the flange 33d is directly pressed to the sound-absorbing material 52a on the partition wall 52 so that the sound-absorbing material 52a can be elastically deformed. In this case, the sound-absorbing material 52a is also used as a seal member, and the structure around the drain pipe 33 can be made simple. In the sixth embodiment, other portions are similar to those of the above-described first embodiment.

Figure 12:
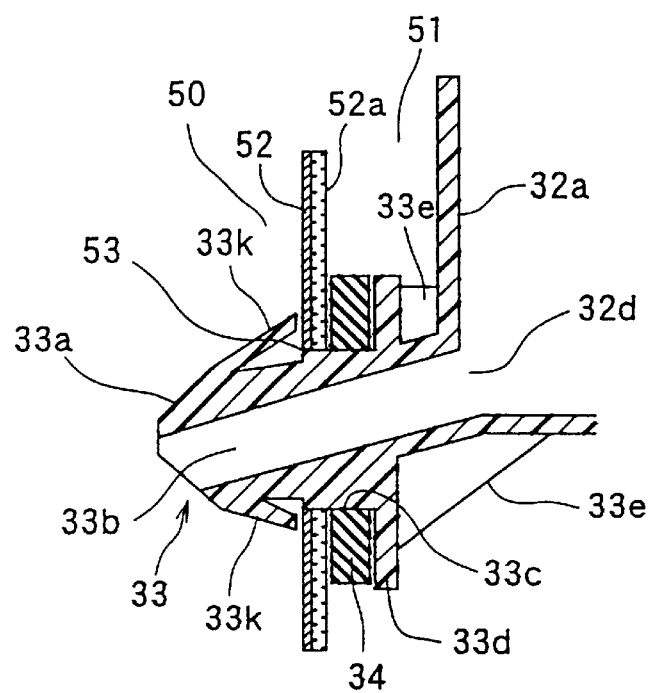
FIG. 12 is a sectional view showing a drain pipe of an air-conditioning unit according to a seventh preferred embodiment of the present invention.

A seventh preferred embodiment of the present invention will be now described with reference to FIG. 12. In the seventh embodiment, an engagement structure of the drain pipe 33 relative to the partition wall 52 is provided without using a screw member, similar to the above-described sixth embodiment. In the seventh embodiment, as shown in FIG. 12, a claw piece 33k expending an umbrella like from the tapered top end 33a toward the inner side of the drain pipe 33 is integrally formed with the drain pipe 33. The claw piece 33k has plural claw piece portions on the drain pipe 33 in the circumferential direction of the drain pipe 33 to be readily elastically deformed in a radial direction of the drain pipe 33. A diameter dimension defined by plural top ends of the plural claw piece portions of the claw piece 33k is set to be larger than the diameter of the through hole 53. When the drain pipe 33 is inserted into the through hole 53, the plural claw piece portions of the claw piece 33k penetrate through the through hole 53 while plural top ends of the plural claw piece portions of the claw piece 33k are elastically deformed toward the inner radial side of the drain pipe 33. After the plural claw piece portions of the claw piece 33k pass through the through hole 53, the plural claw piece portions of the claw piece 33k elastically return to the original shapes, and the top ends of the plural claw piece portions of the claw piece 33k contact the peripheral portion of the through hole 53 of the partition wall 52.

Accordingly, the peripheral portion of the through hole 53 of the partition wall 52 can be held between the claw piece 33k and the flange 33d through the packing 34. Therefore, the front lower side portion of the air-conditioning unit 32 can be engaged with the partition wall 52 by using the engagement claw 33k provided in the drain pipe 33. In the seventh embodiment, the other portions are similar to those of the above-described first embodiment.

Figure 13:
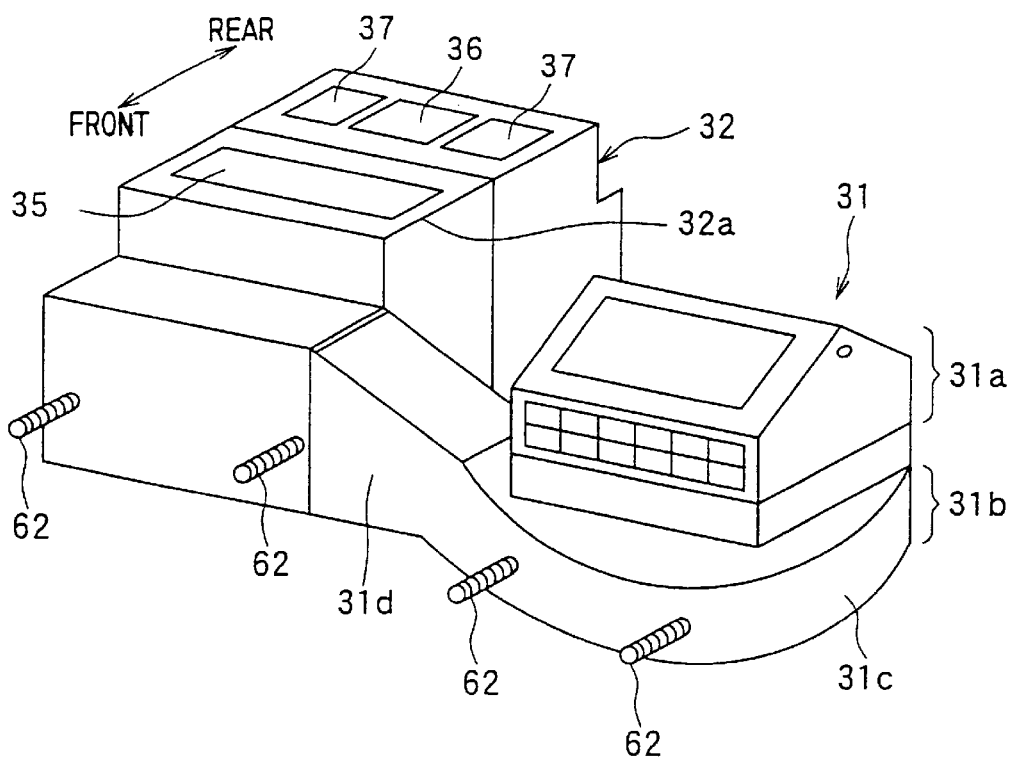
FIG. 13 is a perspective view showing an assembling structure of a blower unit and an air-conditioning unit to a partition wall, according to an eighth preferred embodiment of the present invention.
Figure 14:
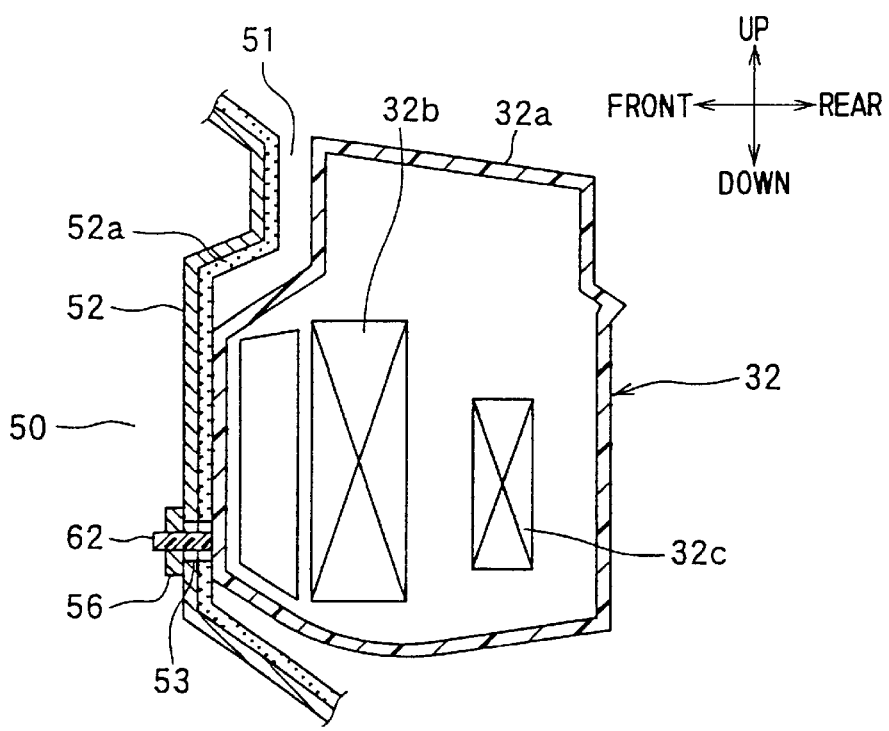
FIG. 14 is a sectional view showing the assembling structure of the air-conditioning unit to the partition wall according to the eighth embodiment.

An eighth preferred embodiment of the present invention will be now described with reference to FIGS. 13 and 14. In the above-described first through seventh embodiments, the front load support portion of the air-conditioning unit 32 is provided in the drain pipe 33. However, in the eighth embodiment, as shown in FIGS. 13, 14, the front load support portion of the air-conditioning unit 32 is provided independently at a position different from the drain pipe 33, as shown in FIGS. 13 and 14.

In the eighth embodiment, as the front load support portion of the air-conditioning unit 32 and the blower unit 31, screw members 62 such as stud bolts are disposed in the fan case 31c of the blower unit 31 and the air-conditioning case 32a of the air-conditioning unit 32. The screw members 62 penetrate through the through holes provided in the partition wall 52 to protrude into the engine compartment 50, and thereafter, nuts 56 are fastened to the screw members 62 from the engine compartment 50. In the eighth embodiment, other portions are similar to those of the above-described first embodiment.

Figure 15:
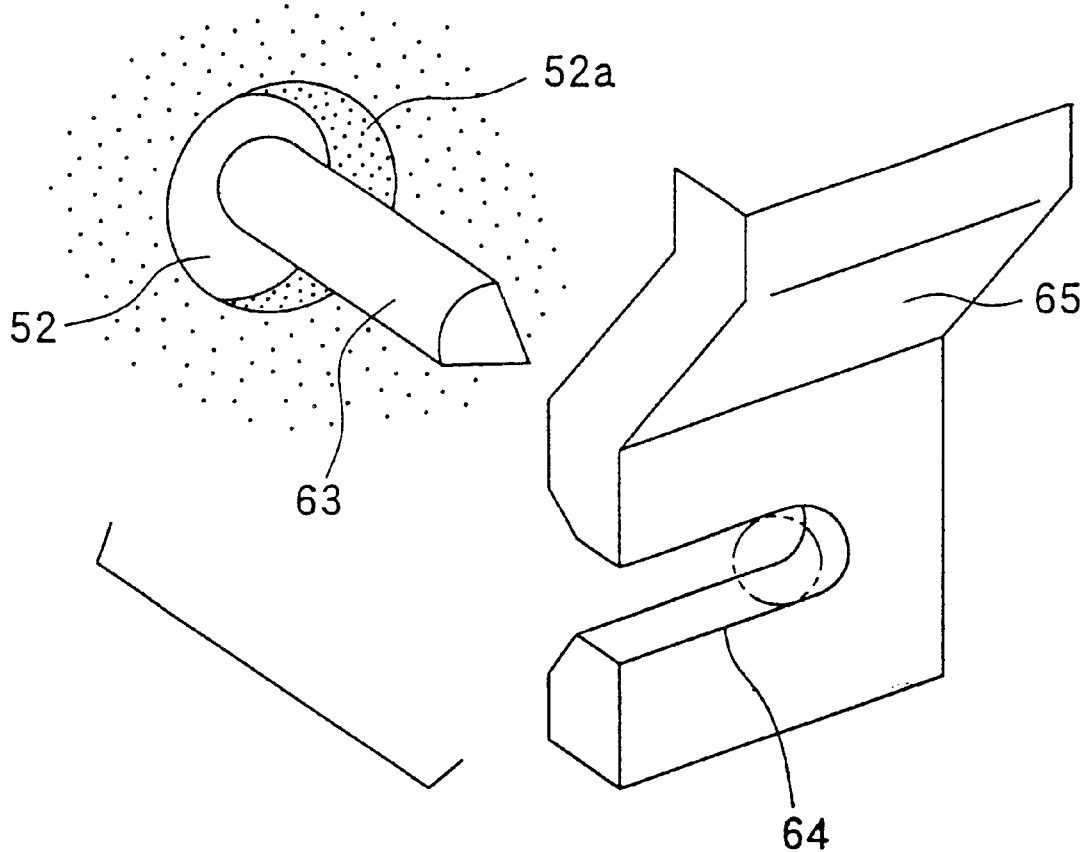
FIG. 15 is an exploded perspective view showing a main part of an assembling structure of a blower unit and an air-conditioning unit to a partition wall, according to a ninth preferred embodiment of the present invention.

A ninth preferred embodiment of the present invention will be now described with reference to FIG. 15. In the ninth embodiment, instead of the screw member 62 described in the eighth embodiment, a pin 63 protruding from the partition wall 52 into the passenger compartment 52 is provided. On the other hand, an attachment piece 65 having a recess 64 engaging with the pin 63 is provided at a front lower side portion of the cases 31c, 32a of the blower unit 31 and the air-conditioning unit 32. By tightly inserting the pin 63 of the partition wall 52 into the recess 64 of the attachment piece 65 of the blower unit 31 and the air-conditioning unit 32, the front lower side portion of the blower unit 31 and the air-conditioning unit 32 can be supported in the partition wall 52. In FIG. 15, only the single pin 63 and the single recess 64 are indicated. However, actually, plural pins 63 are provided to be engaged with plural recesses 64, respectively, similarly to the eight embodiment.

Figure 16:
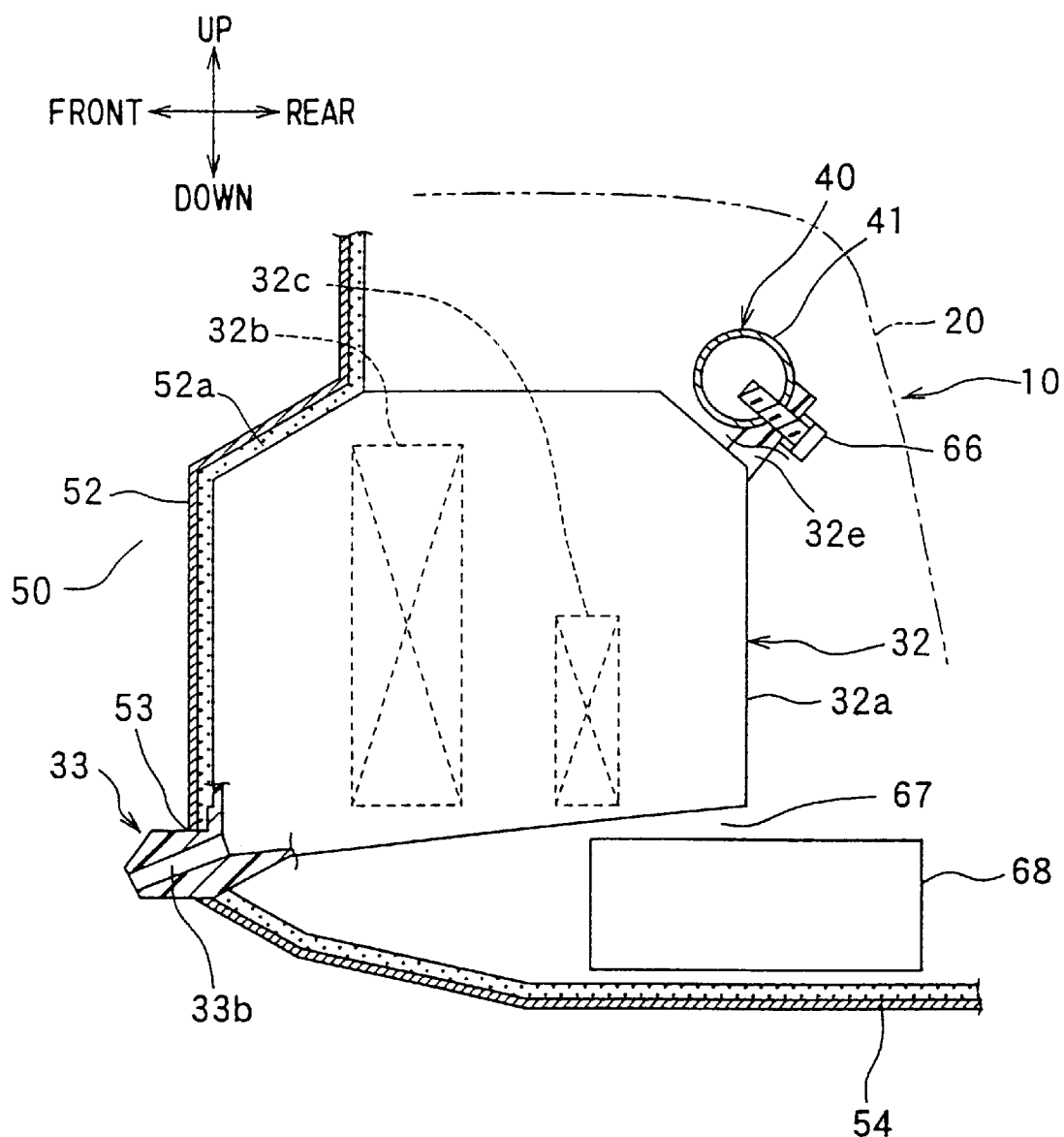
FIG. 16 is a schematic sectional view showing an air-conditioning unit after being mounted on a vehicle, according to a tenth preferred embodiment of the present invention.

A tenth preferred embodiment of the present invention will be now described with reference to FIG. 16. In the above-described first through ninth embodiments, the rear load support portion of the air-conditioning unit 32 is constructed by using the rear foot ducts 39, so that the vehicle rear side portion of the air-conditioning unit 32 is supported by the floorboard 54. In the tenth embodiment, the rear upper side portion of the air-conditioning unit 32 is supported by the strengthening member 40.

That is, according to the tenth embodiment, in the rear upper side portion of the air-conditioning case 32a of the air-conditioning unit 32, the protrusion piece 32e is formed at a single position or plural positions. The protrusion piece 32e is fixed to the strengthening rod 41 of the strengthening member 40 at a predetermined position using a screw 66, for example. Accordingly, the protrusion piece 32e of the air-conditioning case 32a is used for the positioning portion and for the load support portion at the vehicle rear side.

In the tenth embodiment, the load support portion on the vehicle front side of the air-conditioning unit 32 is constructed by the drain pipe 33, similarly to the above-described first embodiment.

According to the tenth embodiment, the protrusion piece 32e on the vehicle rear upper side of the air-conditioning case 32a of the air-conditioning unit 32 is tightly fixed to the strengthening rod 41 of the strengthening member 40 at a predetermined position using the screw 66. Therefore, the vehicle rear side portion of the air-conditioning unit 32 can be accurately supported by the strengthening member 40. Further, the vehicle front side portion of the air-conditioning unit 32 can be accurately supported in the drain pipe 33 by the partition wall 52.

Because the vehicle rear side portion of the air-conditioning unit 32 can be accurately supported by the strengthening member 40, the present invention can be effectively used for an air-conditioning unit 32 without the rear foot ducts 39.

Further, the operation for fixing the protrusion piece 32e of the air-conditioning unit 32 to the strengthening member 40 is performed before the cockpit module assembly 10 (air-conditioning unit 32) is mounted on the vehicle. That is, during the assembling step of the cockpit module assembly 10, the operation for fixing the protrusion piece 32e of the air-conditioning unit 32 to the strengthening member 40 is performed. Therefore, the fixing operation of the protrusion piece 32e can be readily performed in a wide operation space, and assembling performance of the cockpit module assembly 10 on the vehicle can be improved.

Further, because the rear load support portion for fixing the rear foot ducts onto the floorboard 54 is not necessary, an attachment space 67 can be set between the bottom surface of the air-conditioning unit 32 and the floorboard 54. In this case, a component 68 such as an air bag control unit (ECU) can be mounted in the attachment space 67. Generally, in the air bag control unit, an acceleration sensor for detecting a vehicle collision is provided.

An eleventh preferred embodiment of the present invention will be now described with reference to FIG. 17. In the above-described tenth embodiment, the protrusion piece 32e provided at the rear upper side of the air-conditioning case 32a of the air-conditioning unit 32 is fixed to the strengthening rod 41 of the strengthening member 40 by the screw 66. However, in the eleventh embodiment, a rear side portion of the air-conditioning unit 32 is supported by the support stay 43 (see FIG. 1).

Figure 17:
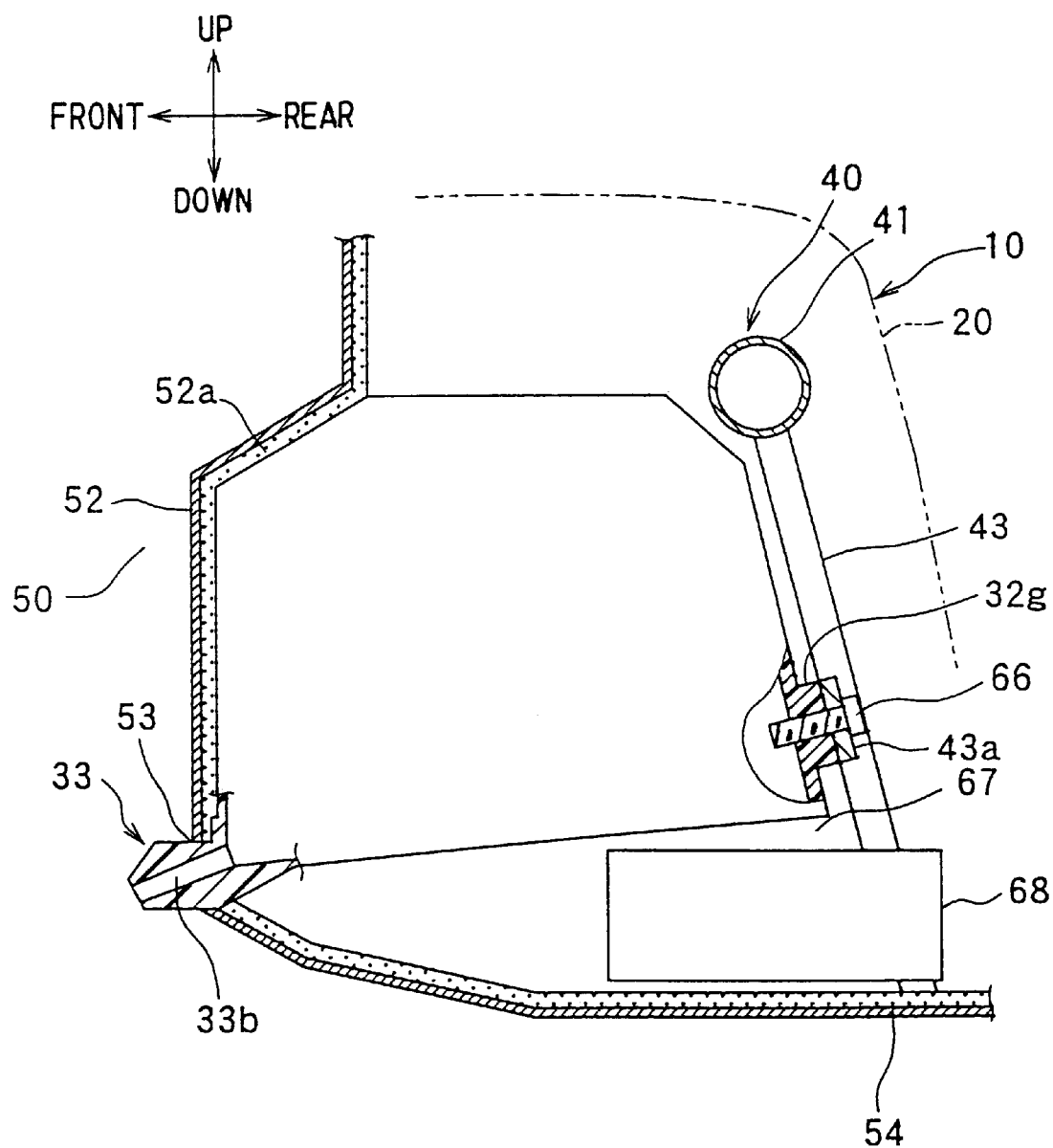
FIG. 17 is a schematic sectional view showing an air-conditioning unit after being mounted on a vehicle, according to an eleventh preferred embodiment of the present invention.

Specifically, as shown in FIG. 17, a protrusion portion 32g protruding toward a vehicle rear side is integrally formed with the air-conditioning case 32a of the air-conditioning unit 32 at a lower side portion of the air-conditioning case 32a. On the other hand, a support plate 43a protruding toward the protrusion portion 32g is integrally formed with the support stay 43. By fastening the support plate 43a to the protrusion portion 32g of the air-conditioning unit 32 using a screw 66, the air-conditioning unit 32 is supported by the support stay 43.

In the eleventh embodiment, other portions are similar to those of the above-described tenth embodiment, and the effect similar to that of the eleventh embodiment can be obtained.

In the eleventh embodiment, the protrusion portion 32g may be formed in the air-conditioning case 32a of the air-conditioning unit 32 along the plate surface of the support stay 43. In this case, the protrusion portion 32g can be directly fastened to the support stay 43 by using a fastening member such as the screw 66.

Figure 18:
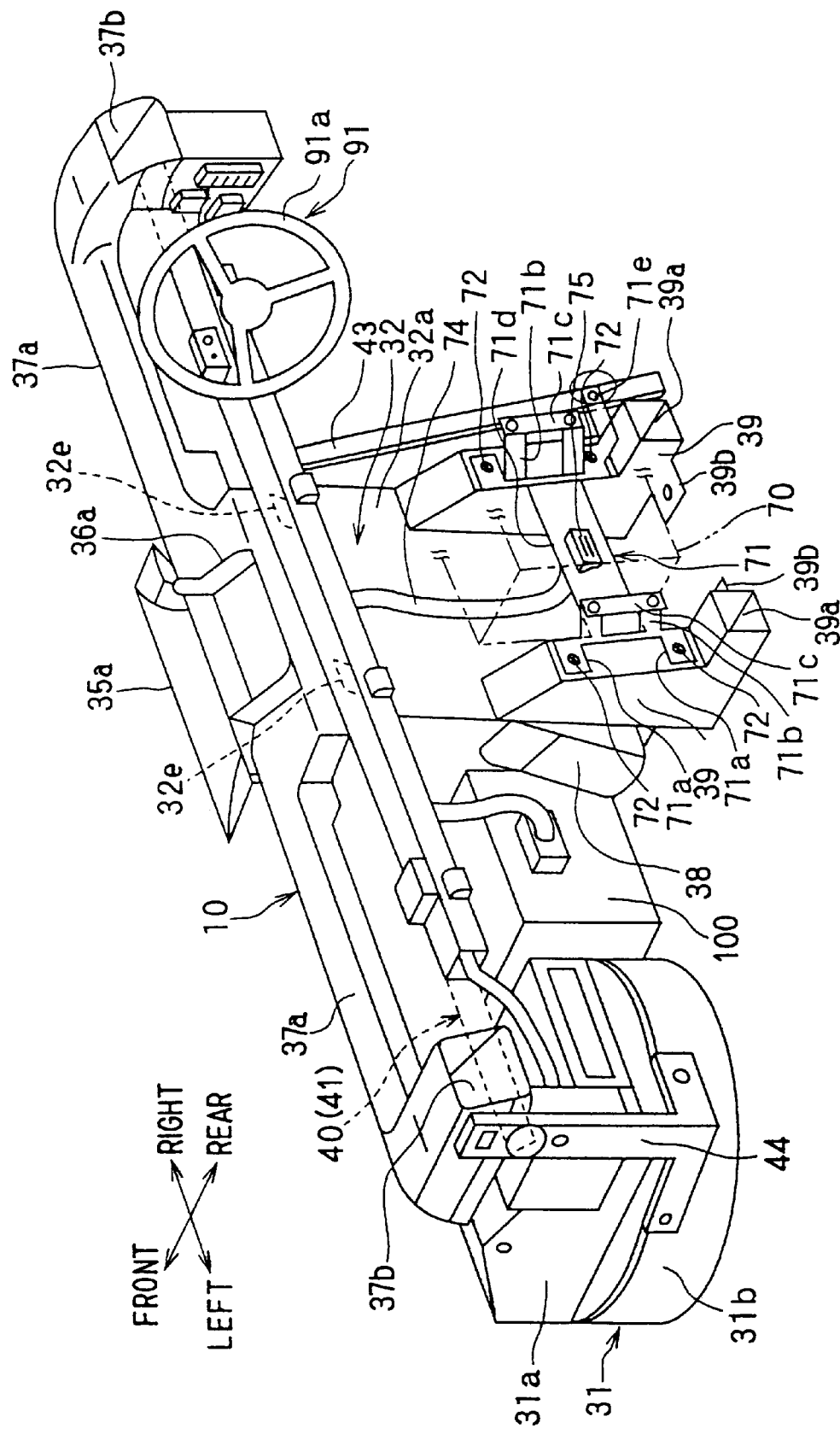
FIG. 18 is a perspective view of a vehicle cockpit module assembly before being assembled to a dashboard, according to a twelfth preferred embodiment of the present invention.
Figure 19:
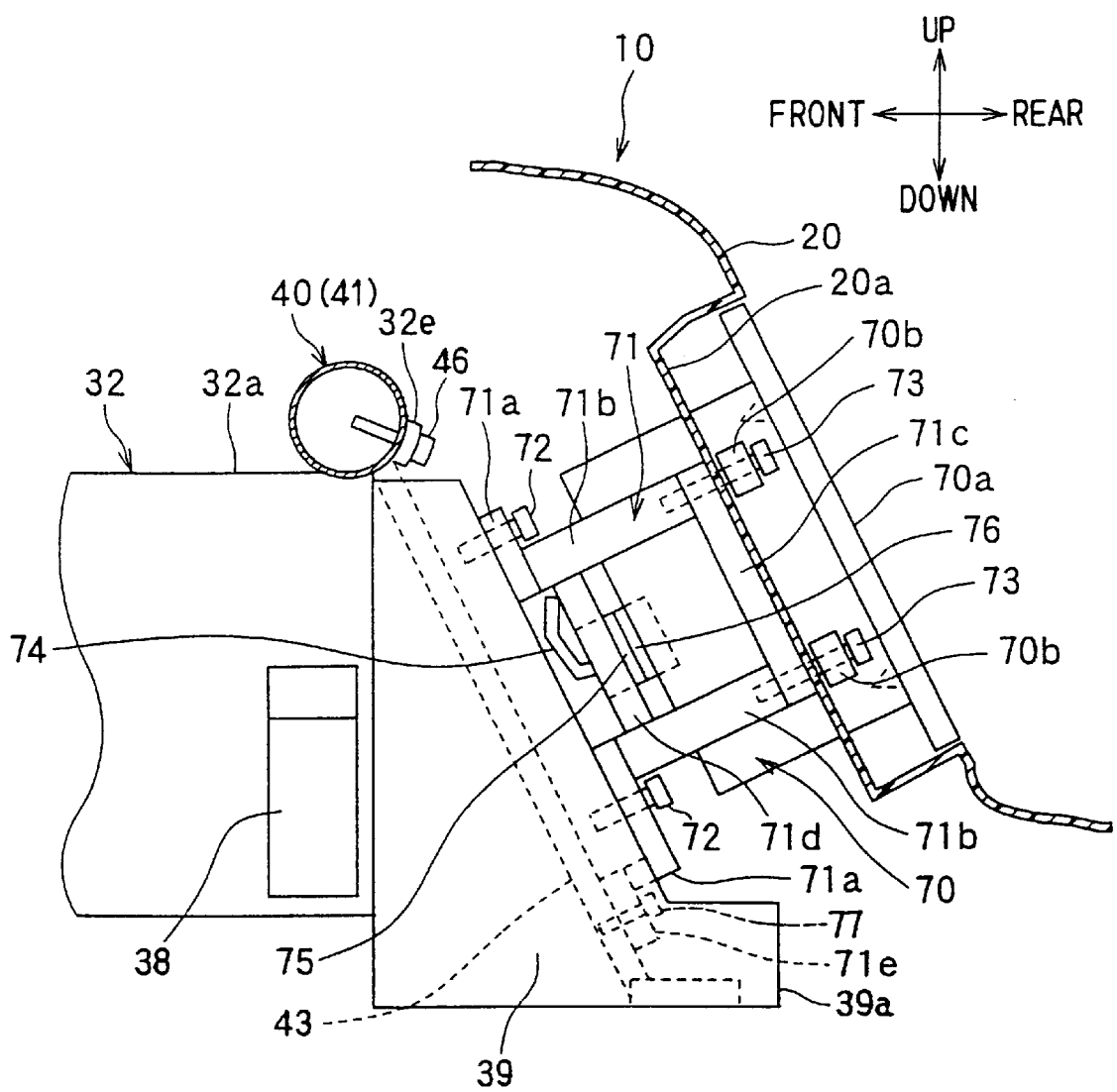
FIG. 19 is a side view showing a fixing structure for fixing a center cluster according to the twelfth embodiment.

A twelfth preferred embodiment of the present invention will be now described with reference to FIGS. 18–20. In the twelfth embodiment, components similar to those of the above-described first embodiment are indicated with the same reference numbers, and the detail explanation thereof is omitted. In the twelfth embodiment, FIG. 18 shows an assembling state of a main portion of the cockpit module assembly 10 within the dashboard 20. In the twelfth embodiment, the cockpit module assembly 10 is mounted on the vehicle to correspond to the arrangement in the vehicle up-down direction, in the vehicle right-left direction and in the vehicle front-rear direction, as shown in FIGS. 18–20.

The cockpit module assembly 10 is constructed by assembling plural components such as the air conditioner 30 inside the dashboard 20. In the twelfth embodiment, the present invention is typically applied to a vehicle having a right steering wheel. As shown in FIG. 20, the air conditioner 30 includes the blower unit 31 disposed at a front passenger's seat side (i.e., vehicle left side), and the air-conditioning unit 32 disposed at an approximate center position in the vehicle right-left direction within the dashboard 20.

The blower unit 31 and the air-conditioning unit 32 have the structure similar to that of the above-described first embodiment. The air-conditioning unit 32 includes the air-conditioning case 32a connected to the air-blowing duct 31d of the blower unit 31. The air-conditioning case 32a is made of resin, and is provided to accommodate therein plural air-conditioning components. That is, the air-conditioning components includes an evaporator for cooling air passing therethrough, a heater core for heating air passing therethrough, an air mixing door for controlling temperature of air to be blown into the passenger compartment, and a mode switching door for switching an air outlet mode.

Figure 20:
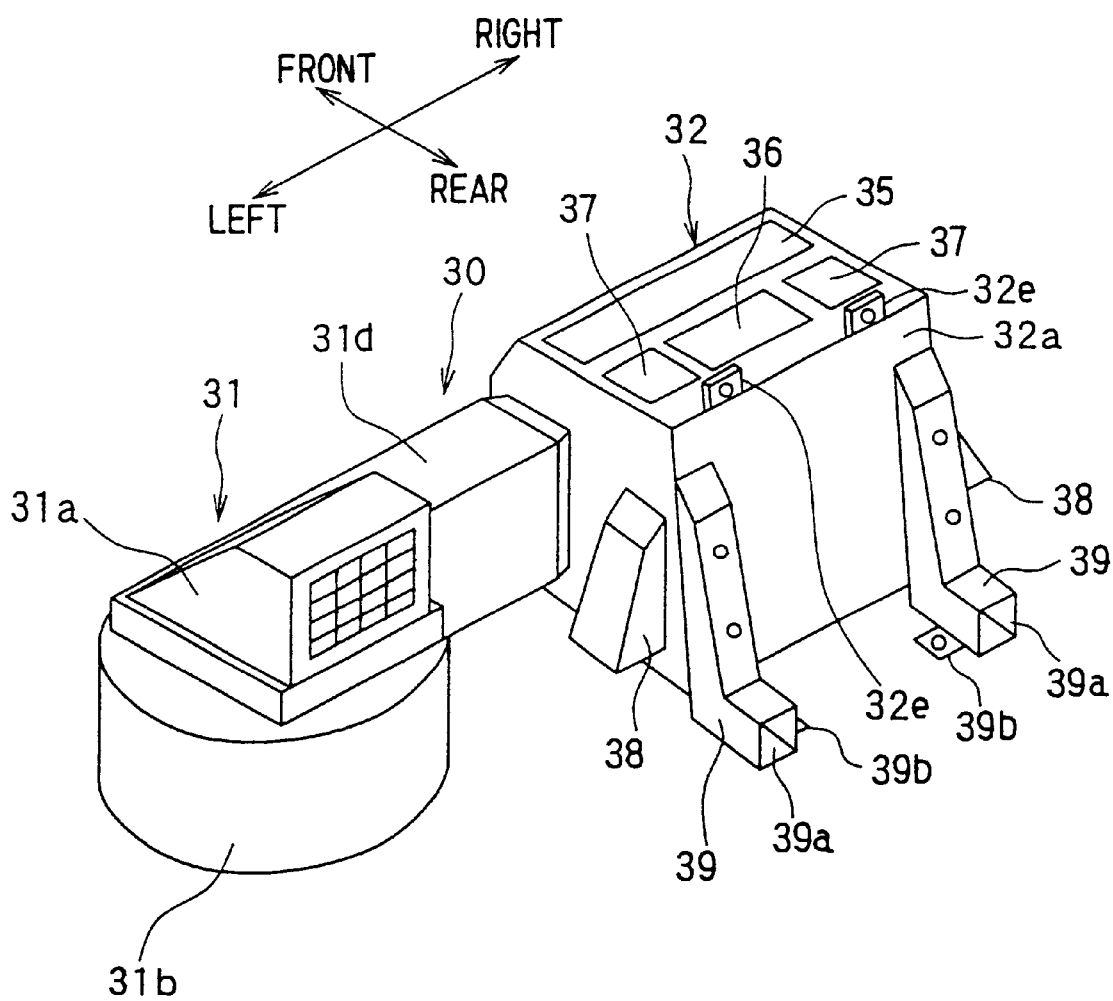
FIG. 20 is a perspective view showing an air conditioner according to the twelfth embodiment.

As shown in FIG. 20, in an upper front surface of the air-conditioning case 32a of the air-conditioning unit 32, the defroster opening 35 is provided. Further, the center face opening 36 is provided at a vehicle rear side of the defroster opening 35, and right and left side face openings 37 are provided at both right and left sides of the center face opening 36, in the upper surface of the air-conditioning case 32a.

Further, as shown in FIGS. 18 and 20, the front foot air ducts 38 are integrally formed with the air-conditioning case 32a at right and left side surfaces. In addition, both right and left rear foot ducts 39 are disposed to extend from a rear side surface of the air-conditioning case 32a downwardly. The top ends 39a of the rear foot ducts 39 are further connected to rear connection ducts extending to a rear seat side in the passenger compartment, so that conditioned air is blown toward the lower side of a passenger on the rear seat from the top ends of the rear foot connection ducts.

As shown in FIG. 20, the right and left attachment pieces 39b are integrally formed with bottom portions of the right and left rear foot ducts 39, respectively. The attachment pieces 39b are attached to the floorboard of the vehicle frame. Because both the rear foot ducts 32f are disposed to protrude from the rear surface of the air-conditioning case 32a toward a vehicle rear side, a recess portion into which a center cluster 70 can be inserted is provided between the right and left rear foot ducts 32f.

On the other hand, the strengthening member 40 (strengthening rod 41) is disposed inside the dashboard 20 to extend in the vehicle right-left side at a vehicle rear upper side of the blower unit 31 and the air-conditioning unit 32, similarly to the above-described first embodiment.

A steering device 91 is fixed to and is supported in the strengthening member 40. In the vehicle having the right steering device 91, a support stay for supporting a steering 91a of the steering device 91 is fixed to the strengthening member 40 at a position near a right end of the strengthening member 40 by melting.

The left side bracket 44 and the right side bracket (not shown) are fixed to both right and left ends of the strengthening member 40 by melting, for example. In the twelfth embodiment, the strengthening member 40 is fixed to the vehicle frame by the side brackets 44. Because the blower unit 31 is disposed at a vehicle left side (front-passenger's seat side), the blower unit 31 is fixed to the left side bracket 44.

On the other hand, a fixing portion for fixing the air-conditioning unit 32 is set in the strengthening member 40 at an approximate center portion in the vehicle right-left direction. That is, both the right and left protrusion pieces 32e are integrally formed with the air-conditioning case 32a of the air-conditioning unit 32 at an upper rear side. The both right and left protrusion pieces 32e are fixed to the strengthening member 40 at the approximate center portion by using the insertion member 46 (e.g., screw).

The defroster opening 35 is connected to a defroster duct 35a shown in FIG. 18, so that conditioned air is blown toward an inner surface of a windshield from the defroster air outlet provided at the top end of the defroster duct 35a. The center face opening 36 is connected to the center face duct 36a shown in FIG. 18, so that conditioned air is blown toward the upper side of a passenger in the passenger compartment from the center face air outlet provided at the top end of the center face duct 36a.

Further, the right and left side face openings 37 are connected to right and left side face ducts 37a, so that cool air is blown from side face air outlets 37b toward the side upper side of the passenger in the passenger compartment during a cooling operation, and warm air is blown from the side face air outlets 37b toward a side windshield of the vehicle during a heating operation.

As shown in FIG. 18, an electronic control unit (ECU) 100 for controlling the air conditioner 30 is disposed between the blower unit 31 and the air-conditioning unit 32 at a rear side from the air-blowing duct 31d.

Next, a structure portion for fixing the center cluster 50 will be described. The center cluster 70 is an integrated structure (i.e., a gathering member) in which plural components such as a radio and an audio device are integrally gartered. For example, in the twelfth embodiment, the center cluster 70 is formed into a box like. In FIG. 18, a left portion of the center cluster 70 is indicated only by the chain line. As shown in FIG. 19, an operation panel portion 70a of the center cluster 70 is accommodated in a recess portion 20a at a center position of the dashboard 20 to be directly exposed into the passenger compartment, so that the operation panel portion 70a can be manually operated by a passenger in the passenger compartment. A hole (not shown), through which a box-like body portion of the center cluster 70 can be inserted, is provided in a center portion of the recess portion 20a of the dashboard 20.

In the twelfth embodiment, the center cluster 70 is fixed to the rear foot air ducts 39 to be disposed between both the right and left rear foot air ducts 39. That is, a bracket 71 for fixing the center cluster 50 has four bottom end portions 71a contacting the rear side surfaces of the rear foot air ducts 39, and the bottom end portions 71a of the bracket 71 are fastened to the rear side surfaces of the right and left rear foot ducts 39 by using screw members 72. The bracket 71 is formed into a plate like, and is made of a metal such as an iron group metal, for example.

Attachment leg portions 71b standing vertically from the bottom end portions 71a are formed in the bracket 71. A right attachment piece 71c is formed integrally with both top ends of the right attachment leg portions 71b by bending the right attachment leg portions 71b. Similarly, a left attachment piece 71c is formed integrally with both top ends of the left attachment leg portions 71b by bending the left attachment leg portions 71b. On the other hand, as shown in FIG. 19, both brackets 70b are disposed each of right and left side surfaces of the center cluster 70. Each of the brackets 70b is made of an iron group metal, and is formed into a plate like.

The attachment leg portions 71b of the bracket 71 press-contact an inner surface of a peripheral portion defining the hole portion of the recess portion 20a of the dashboard 20, and the bracket 70b of the center cluster 70 press-contacts an outer surface of the peripheral portion defining the hole portion of the recess portion 20a of the dashboard 20. In this state, the attachment leg portions 71b of the bracket 71, the brackets 70b of the center cluster 70 and the dashboard 20 are fastened by using four screw members 73 such as tapping screws.

Further, a receiving connector 75 electrically connected to an electrical wire 74 of the vehicle is disposed at a predetermined center portion of connection piece 71d connecting both right and left base portions of the attachment leg portion 71b. The receiving connector 75 is disposed at the predetermined center portion of the connection piece 71d, and is fixed to be electrically insulated in the connection piece 71d. Within the receiving connector 75, a male terminal (not shown) is inserted.

A connector 76 is fixed at a bottom center portion of the center cluster 70, opposite to the connection piece 71d of the bracket 71. The connector 76 is disposed to be inserted into the receiving connector 75. That is, the connector 76 has therein a female terminer into which the male terminer of the receiving connector 75 is inserted.

Further, an attachment piece 71e is formed to protrude to right side from the right lower bottom end portion 71a, among the four bottom end portions 71a of the bracket 71. The attachment piece 71e of the bracket 71 is fixed to the reinforcement support stay 43 using a screw member 77.

Next, mounting steps of the cockpit module assembly 10 on the vehicle will be now described. One end of the reinforcement support stay 43 is integrally connected to a predetermined position of the strengthening rod 41 of the strengthening member 40 by melting beforehand. First, the blower unit 31 and the air-conditioning unit 32 are assembled to the strengthening member 40. Specifically, the blower unit 31 is attached to the left side bracket 44 of the strengthening member 40 by using a fastening member such as a screw. Further, the protrusion pieces 32e provided at the upper rear portion of the air-conditioning unit 32 are assembled to the predetermined positions of the strengthening rod 41 of the strengthening member 40.

After the air-conditioning unit 32 is assembled to the strengthening member 40, the bottom end portions 71a of the bracket 71 for fixing the center cluster 70 are fastened to the right and left rear foot ducts 39 by the screw members 72. The right and left rear foot ducts 39 are provided at a vehicle rear side in the air-conditioning case 32a of the air-conditioning unit 32.

The attachment piece 71e protruding from the right lower bottom end portion 71a of the bracket 71 is fixed to the reinforcement support stay 43 by the screw member 77.

The defroster duct 35a, the center face duct 36a and the side face duct 37a are integrally assembled beforehand, and the integrated portions of the ducts 35a, 36a, 37a are assembled to the strengthening member 40 by using screw members. On the other hand, the electronic control unit 100 is assembled to the blower unit 31 and the air-conditioning unit 32 by screw members to be inserted between the blower unit 31 and the air-conditioning unit 32. In the twelfth embodiment, the electronic control unit 100 may be directly assembled to the strengthening member 40.

FIG. 18 shows a state after the blower unit 31, the air-conditioning unit 32 and the integrated portion of the ducts 35a–37a and the like are assembled to the strengthening member 40, and the electronic control unit 100 is assembled to the blower unit 31 and the air-conditioning unit 32.

Further, a steering housing (not shown) of the steering device 91 in an axial direction is supported and fixed to the support stay for the steering device 91, so that the axial portion of the steering device 91 can be supported in and fixed to the strengthening member 40. Here, a steering wheel 91a of the steering device 91 is assembled after the assembling steps of the dashboard 20 are finished.

Next, the blower unit 31, the air-conditioning unit 32 and the like integrated with the strengthening member 40 are accommodated inside the dashboard 20 and are integrally assembled with the dashboard 20. The strengthening member 40 and the dashboard 20 can be integrated by various methods. For example, an attachment portion is provided to the side bracket 44, and the strengthening member 40 can be assembled to the dashboard 20 using the attachment portion of the side bracket 44.

While the strengthening member 40 is assembled to the dashboard 20, the attachment position between the dashboard 20 and the air-conditioning unit 32 is set so that the attachment leg portions 71b of the bracket 71 press-contact the inner surface of the peripheral portion defining the hole portion of the recess portion 20a of the dashboard 20. Finally, the center cluster 70 is assembled, and the assembling operation of the cockpit module assembly 10 is finished.

Next, the assembling operation of the center cluster 70 is described in detail. The center cluster 70 is pressed to the bracket 71 inside the dashboard 20 through the hole portion of the recess portion 20a of the dashboard 20. In this state, the female connector 76 provided on the bottom surface portion of the box-like body portion of the center cluster 70 is engaged with the receiving connector 75 provided in the connection piece 71d of the bracket 71. With the engagement of the both connectors 75, 76, an electrical circuit of the center cluster 70 is electrically connected to the electrical wire 74 of the vehicle frame.

When both the connectors 75, 76 engage with each other, the brackets 70b of the center cluster 70 press-contact the outer surface of the peripheral portion defining the hole portion of the recess portion 20a of the dashboard 20. Next, the three parts of the attachment leg portions 71b of the bracket 71, the brackets 70b of the center cluster 70 and the dashboard 20 are fastened by using the screw members 73.

Accordingly, the center cluster 70 can be fixed to the dashboard 20 and the air-conditioning unit 32 using the bracket 71 fixed to the air-conditioning unit 32. In the twelfth embodiment, during the assembling operation of the center cluster 70, the electrical connection between the electrical circuit of the center cluster 70 and the electrical wire 74 of the vehicle frame can be simultaneously performed. Further, the attachment piece 71e of the bracket 71 is fixed to reinforcement support stay 43. Therefore, a ground side of the electrical circuit of the center cluster 70 can be grounded to the vehicle frame through the bracket 70b, the screw member 73, the bracket 71 and the reinforcement support stay 43.

By the above-described assembling operations, all of the cockpit module assembly 10 including the center cluster 70 are assembled.

Next, the cockpit module assembly 10 is mounted on the vehicle. That is, both the right and left ends of the strengthening member 40 are fastened to the right and left side wall portions of the vehicle frame at the left side bracket 44 and the right side bracket (not shown) by using screw members. Further, the dashboard 20 is also fixed to the vehicle frame using screw members.

In the air-conditioning unit 32, the attachment pieces 39b protruding from the bottom surface of the rear foot ducts 39 are fixed to the floorboard. Accordingly, the upper side of the air-conditioning unit 32 is fixed to the strengthening member 40, and the bottom surface thereof is fixed to the floorboard of the vehicle. Therefore, the air-conditioning unit 32 can be stably fixed in the mounting state of vehicle.

Further, in the blower unit 31, in addition to the fixing portion fixed to the strengthening member 40, a fixing portion fixed to the partition wall or a fixing portion fixed to the side wall of the vehicle frame can be added.

In the above-described twelfth embodiment, the steering device 91 is assembled as a part of the cockpit module assembly 10 before being mounted on the vehicle. However, after the cockpit module assembly 10 is mounted on the vehicle, the housing member of the steering device 91 may be fixed to the support stay of the strengthening member 40.

Figure 21:
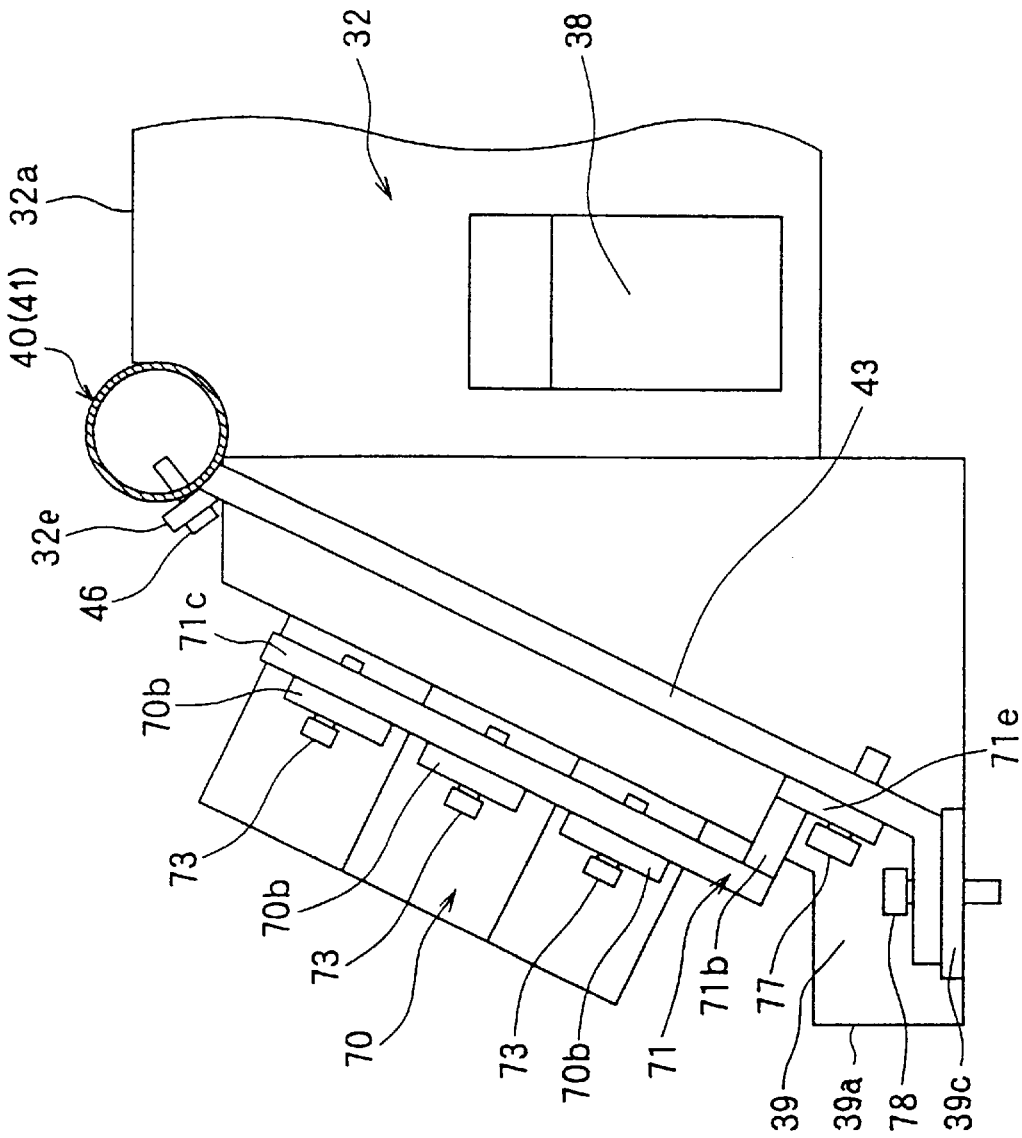
FIG. 21 is a side view showing a fixing structure for fixing a center cluster according to a thirteenth preferred embodiment of the present invention.

A thirteenth preferred embodiment of the present invention will be now described with reference to FIG. 21. In the thirteenth embodiment, the attachment of the bottom end portion 71a to the right rear foot duct 39 due to the screw member 72 described in the twelfth embodiment is not provided.

In the thirteenth embodiment, an attachment piece 39c protruding from the bottom surface of the rear foot duct 39 toward the reinforcement support stay 43 is formed. The attachment piece 39c is fixed to the reinforcement support stay 43 and the floorboard integrally by the screw member 78, as shown in FIG. 21.

According to the thirteenth embodiment, while both the right rear foot duct 39 and the reinforcement support stay 43 are fixed together to the floorboard, the attachment piece 71e of the bracket 71 is fixed to the reinforcement support stay 43. Accordingly, relative to the reinforcement support stay 43, the air-conditioning unit 32 and the center cluster 70 can be relatively accurately assembled. Thus, in the thirteenth embodiment, the structure of the bracket 71 can be made simple. In the thirteenth embodiment, the other portions are similar to those of the above-described twelfth embodiment.

Figure 22:
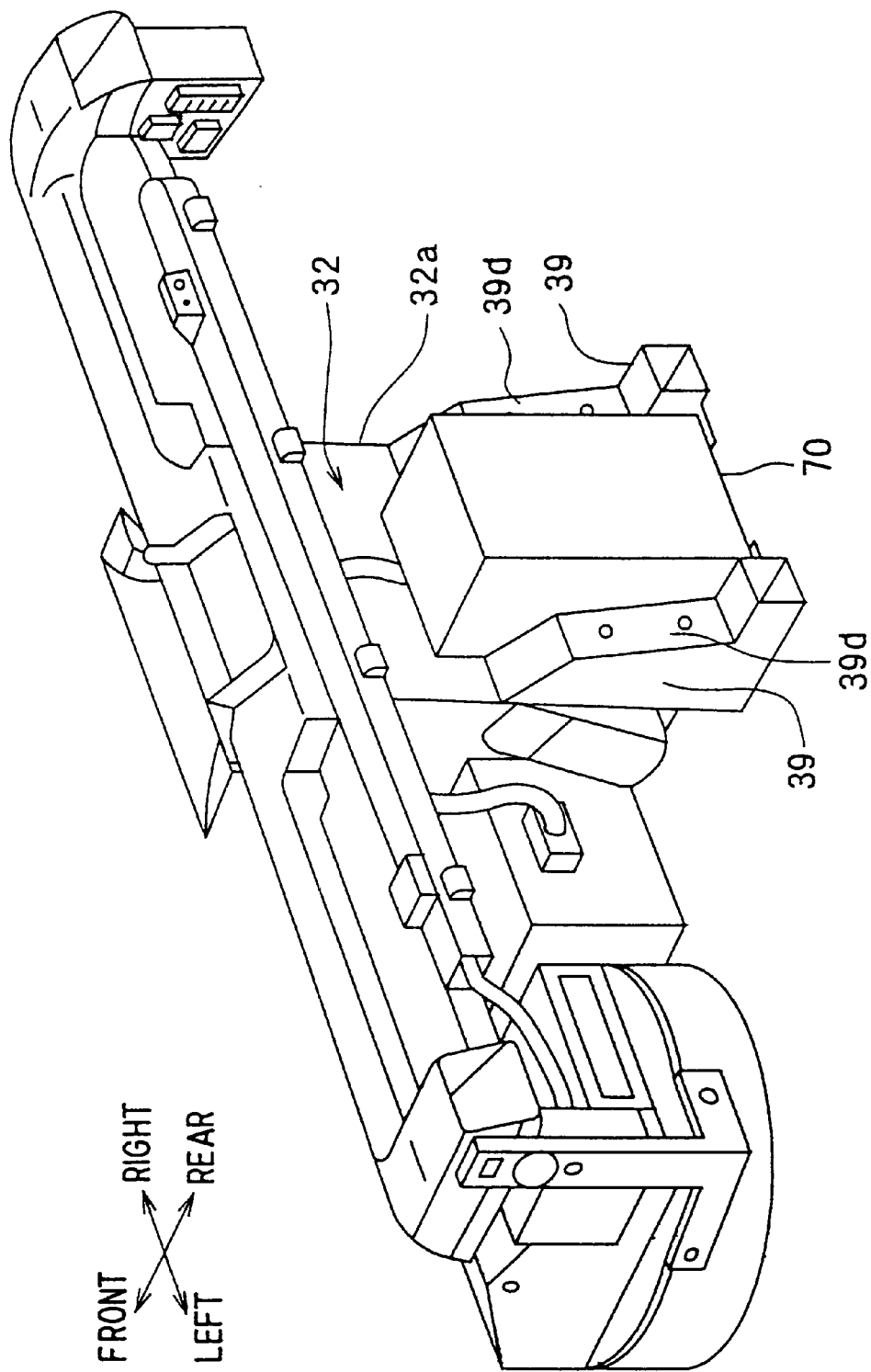
FIG. 22 is a perspective view of a vehicle cockpit module assembly before being assembled to a dashboard, according to a fourteenth preferred embodiment of the present invention.

A fourteenth preferred embodiment of the present invention will be now described with reference to FIG. 22. In the fourteenth embodiment, the box-like body portion of the center cluster 70 is disposed to be inserted into a recess portion between both the right and left rear foot ducts 39.

Even in the fourteenth embodiment, a bracket similar to the bracket 71 described in the twelfth and thirteenth embodiments can be fixed to rear side surfaces 39d of the rear foot ducts 39, and the center cluster 70 can be fixed to the rear foot ducts 39 using the bracket.

Figure 23:
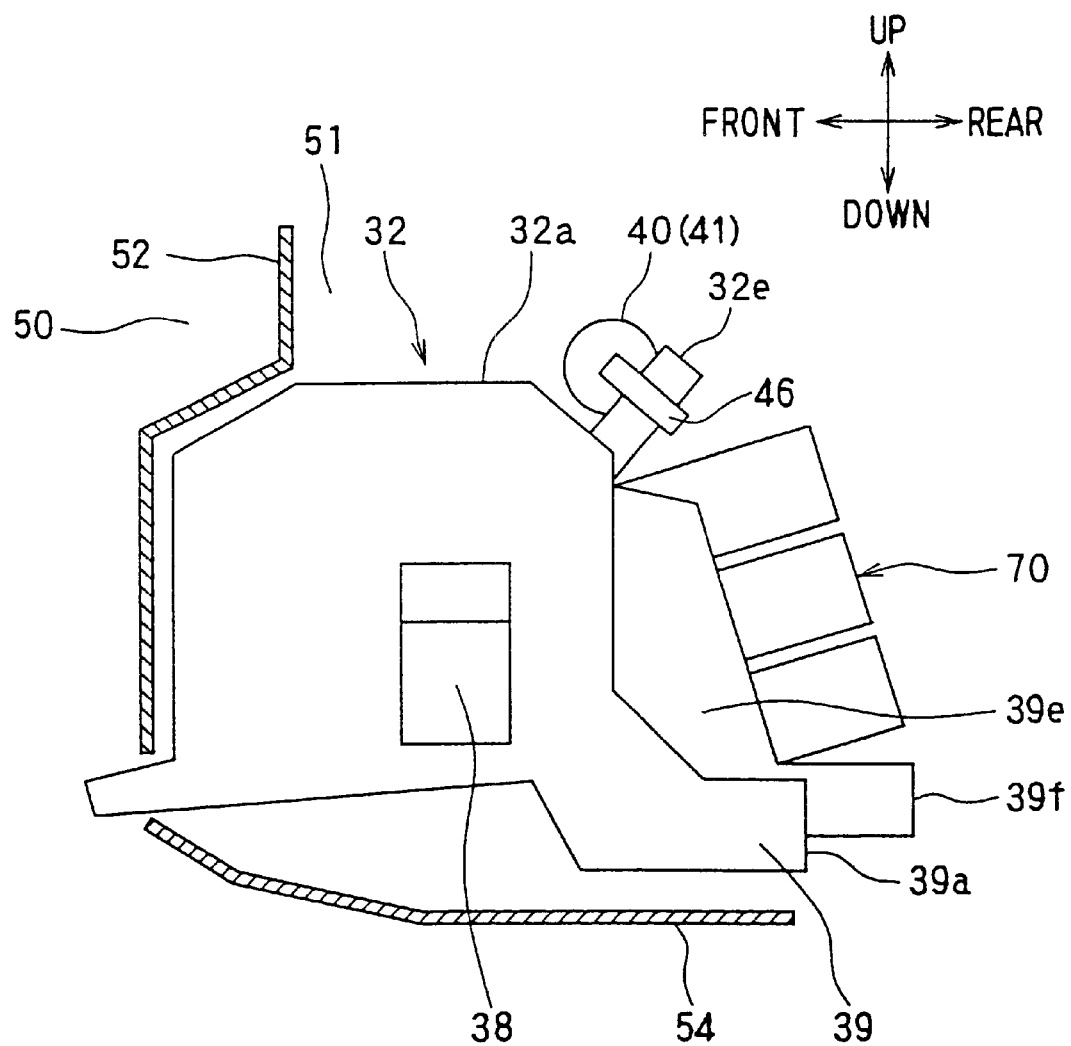
FIG. 23 is a side view of an air-conditioning unit, showing a fixing structure for fixing a center cluster, according to a fifteenth preferred embodiment of the present invention.

A fifteenth preferred embodiment of the present invention will be now described with reference to FIG. 23. In the fifteenth embodiment, right and left rear face ducts 39e are disposed in the air-conditioning unit 32 at inner sides of the right and left rear foot ducts 39 in the vehicle right-left direction, as shown in FIG. 23. In the fifteenth embodiment, a box-like body portion of the center cluster 70 is disposed between both the right and left rear face ducts 39e, and the center cluster 70 is fixed to the right and left rear face ducts 39e. Top ends 39f of the rear face ducts 39e are connected to a rear face outlets through rear face connection ducts, so that conditioned air is blown toward the upper side of a passenger on the rear seat of the passenger compartment from the rear face outlets. In the fifteenth embodiment, similarly to the above-described first embodiment, the passenger compartment 51 and the engine compartment 50 are partitioned by the partition wall 52, and the floorboard 54 is indicated in FIG. 23.

Although the present invention has been fully described in connection with the preferred embodiments thereof with reference to the accompanying drawings, it is to be noted that various changes and modifications will become apparent to those skilled in the art.

For example, in the above-described first embodiment, the rear foot ducts 39 are disposed at a vehicle rear side portion of the air-conditioning unit 32, the attachment pieces 39b are formed on the bottom surface portion of the rear foot ducts 39, and the rear foot ducts 39 are used as the load support portion of the air-conditioning unit 32 on the vehicle rear side. However, in a case where rear face ducts are disposed at vehicle rear side portion of the air-conditioning unit 32, similarly to the above-described fifteenth embodiment, the attachment pieces 39b may be formed in the rear face ducts, and the rear face ducts may be used as the load support portion of the air-conditioning unit 32 on the vehicle rear side. Further, in a case where the rear foot ducts and the rear face ducts are not provided in the air-conditioning unit 32, the attachment pieces 39b may be formed on a rear lower side portion of the air-conditioning case 32a of the air-conditioning unit 32.

In the above-described embodiments, the strengthening member 40 may be made of a resin having a high strength.

Further, in the above-described twelfth and thirteenth embodiments, the bracket 71 is attached to the rear foot ducts 39. However, a bracket-shaped portion corresponding to the bracket 71 may be integrally formed in the rear foot ducts 39 or the rear face ducts 39e, and the center cluster 70 may be fixed to the bracket-shaped portion. That is, the center cluster 70 may be fixed to the bracket-shaped portion of the air duct, directly.

Such changes and modifications are to be understood as being within the scope of the present invention as defined by the appended claims.

What is claimed is:

1. A cockpit module assembly for a vehicle having a frame, comprising:
    a dashboard;
    at least an air conditioner disposed inside the dashboard, the air conditioner including an air-conditioning unit having therein a heat exchanger for performing a heat exchange with air;
    a positioning portion, provided in the air-conditioning unit, for determining an arrangement position of the air-conditioning unit inside the dashboard during an assembling state before being mounted on the vehicle; and
    first and second load support portions which support load of the air-conditioning unit, the first and second load support portion being provided at a vehicle rear lower side and a vehicle front side of the air-conditioning unit, respectively, to be assembled to the frame during a vehicle mounting state after the assembling state.

2. The cockpit module assembly according to claim 1, wherein:
the air-conditioning unit has a rear air duct through which air flows toward a vehicle rear side within a passenger compartment of the vehicle;
the rear air duct has an attachment piece being attached to a floorboard of the frame during the vehicle mounting state; and
the first load support portion is constructed by the rear air duct.

3. The cockpit module assembly according to claim 2, wherein the rear air duct is a rear foot duct through which air flows toward a vehicle rear lower side within the passenger compartment.

4. The cockpit module assembly according to claim 1, further comprising:
a strengthening member, disposed inside the dashboard, for supporting a steering device of the vehicle,
wherein the positioning portion is set at a predetermined position of the strengthening member so that an arrangement position of the air-conditioning unit is determined, during the assembling state.

5. The cockpit module assembly according to claim 4, wherein:
the strengthening member is disposed inside the dashboard to extend in a vehicle right-left direction;
the strengthening member has fastening portions at both right and left ends, through which the strengthening member is fixed to the frame;
the air conditioner further has a blower unit for blowing air into the air-conditioning unit; and
the blower unit has an another load support portion which is assembled to one of the fastening portions of the strengthening member.

6. The cockpit module assembly according to claim 1, wherein:
the air conditioner further includes a blower unit for blowing air into the air-conditioning unit; and
the blower unit has an another load support portion which is supported in the frame during the vehicle mounting state.

7. The cockpit module assembly according to claim 1, wherein:
the heat exchanger has at least a cooling unit for cooling air passing therethrough;
the air-conditioning unit has a drain pipe at a vehicle front lower side, through which condensed water generated by the cooling unit is discharged to an outside;
the drain pipe is disposed to be inserted into a through hole provided in a partition wall of the frame, for defining a passenger compartment in the vehicle; and
the second load support portion is constructed by the drain pipe.

8. The cockpit module assembly according to claim 7, wherein:
the drain pipe has therein a drain passage which is tilted downwardly from a drain port of an inner bottom surface of the air-conditioning unit, and an outer peripheral surface being inserted into the through hole of the partition wall;
the outer peripheral surface of the drain pipe extends approximately horizontally; and
a wall part defining the through hole of the partition wall is provided approximately horizontally.

9. The cockpit module assembly according to claim 7, wherein:
the drain pipe has a male screw on an outer peripheral surface; and
the male screw of the drain pipe is disposed to be fastened from an outside of the passenger compartment.

10. The cockpit module assembly according to claim 7, wherein:
the drain pipe has a recess recessed from an outer peripheral surface; and
the recess is provided to be engaged with a peripheral wall part defining the through hole of the partition wall.

11. The cockpit module assembly according to claim 7, wherein:
the drain pipe has a claw piece elastically deformed; and
the claw portion is disposed to be engaged with a peripheral wall part defining the through hole of the partition wall by the elastic deformation after the drain pipe is inserted into the through hole.

12. The cockpit module assembly according to claim 7, wherein:
the partition wall is for partitioning the passenger compartment from an engine compartment;
the dashboard is disposed adjacent to the partition wall; and
the drain pipe is disposed to protrude from the passenger compartment to the engine compartment through the through hole provided in the partition wall.

13. The cockpit module assembly according to claim 12, wherein:
the cooling unit has a pipe portion disposed adjacent to the drain pipe;
the pipe portion of the cooling unit is disposed to protrude from the passenger compartment to the engine compartment through an another through hole provided in the partition wall; and
the through hole through which the drain pipe penetrates and the another through hole through which the pipe portion of the cooling unit penetrates are sealed by a common elastic seal member.

14. The cockpit module assembly according to claim 13, wherein:
the heat exchanger further has a heating unit for heating air passing therethrough;
the heating unit has a pipe portion adjacent to the pipe portion of the cooling unit; and
the pipe portion of the heating unit is disposed to protrude from the passenger compartment to the engine compartment through the another through hole for the pipe portion of the cooling device.

15. The cockpit module assembly according to claim 1, further comprising:
a strengthening member, disposed inside the dashboard to extend in a vehicle right-left direction, for supporting a steering device of the vehicle, wherein:
the air-conditioning unit is disposed inside the dashboard at an approximate center position in the vehicle right-left direction;
the air-conditioning unit has an air-conditioning case for defining an air passage through which air flows into a passenger compartment;
at least a part of the air-conditioning unit is fixed to the dashboard through the strengthening member; and
the air-conditioning case has a fixing portion at a vehicle rear side position, for fixing a center cluster in which plural electrical components are integrally gathered.

16. The cockpit module assembly according to claim 15, further comprising:
- a first connector electrically connected to an electrical wire of the vehicle, the first connector being disposed at a vehicle rear side position in the air-conditioning case; and
- a second connector engaged with the first connector, the second connector being disposed in the center cluster, wherein,
    - when the center cluster is pressed toward the air-conditioning case, both the first connector and the second connector are engaged so that an electrical circuit of the center cluster is electrically connected to the electrical wire of the vehicle.

17. The cockpit module assembly according to claim 15, wherein:
- the air-conditioning case has both right and left rear air ducts through which air flows toward both right and left sides on a vehicle rear side of the passenger compartment; and
- the fixing portion for fixing the center cluster is provided in the right and left rear air ducts.

18. The cockpit module assembly according to claim 17, wherein:
- the right and left rear air ducts protrude from a surface of the air-conditioning case to a vehicle rear side; and
- the center cluster is inserted between both the right and left rear air ducts.

19. The cockpit module assembly according to claim 17, wherein the right and left rear air ducts are rear foot ducts through which air flows toward a lower rear side of the passenger compartment.

20. The cockpit module assembly according to claim 17, wherein the right and left rear air ducts are rear face ducts through which air flows toward an upper rear side of the passenger compartment.

21. A cockpit module assembly for a vehicle having a frame, comprising:
- a dashboard;
- a strengthening member disposed inside the dashboard to extend in a vehicle right-left direction; and
- an air-conditioning unit for adjusting temperature of air blown into a passenger compartment, the air-conditioning unit being disposed inside the dashboard at an approximate center position in a vehicle right-left direction, wherein:
- the air-conditioning unit has an air-conditioning case for defining an air passage through which air flows into the passenger compartment;
- at least a part of the air-conditioning unit is fixed to the dashboard through the strengthening member; and
- the air-conditioning case has a fixing portion at a vehicle rear side position, for fixing a center cluster in which plural electrical components are integrally gathered.

22. The cockpit module assembly according to claim 21, further comprising:
- a first connector electrically connected to an electrical wire of the vehicle, the first connector being disposed at a vehicle rear side position in the air-conditioning case; and
- a second connector engaged with the first connector, the second connector being disposed in the center cluster, wherein,
    - when the center cluster is pressed toward the air-conditioning case, both the first connector and the second connector are engaged so that an electrical circuit of the center cluster is electrically connected to the electrical wire of the vehicle.

23. The cockpit module assembly according to claim 22, further comprising
- a bracket fixed to the fixing portion, for fixing the center cluster, wherein:
- the first connector is fixed to the bracket; and
- the center cluster is assembled to the bracket so that the second connector of the center cluster is engaged with the first connector.

24. The cockpit module assembly according to claim 21, further comprising:
- a reinforcement support member disposed to extend from the strengthening member to the frame of the vehicle along a side surface of the air-conditioning case on a driver's seat side; and
- a bracket fixed to the fixing portion, for fixing the center cluster, wherein:
- the bracket has an attachment portion at which the bracket is fixed to the reinforcement support member; and
- an electrical circuit of the center cluster is grounded to the frame of the vehicle through the bracket and the reinforcement support member.

25. The cockpit module assembly according to claim 24, wherein the air-conditioning case has an attachment portion being fixed to the reinforcement support member, on the driver's seat side.

26. The cockpit module assembly according to claim 21, wherein:
- the air-conditioning case has both right and left rear air ducts through which air flows toward both right and left sides on a vehicle rear side of the passenger compartment; and
- the fixing portion for fixing the center cluster is provided in the right and left rear air ducts.

27. The cockpit module assembly according to claim 26, wherein:
- the right and left rear air ducts protrude from a surface of the air-conditioning case to a vehicle rear side; and
- the center cluster is inserted between both the right and left rear air ducts.

28. The cockpit module assembly according to claim 26, wherein the right and left rear air ducts are rear foot ducts through which air flows toward a lower rear side of the passenger compartment.

29. The cockpit module assembly according to claim 26, wherein the right and left rear air ducts are rear face ducts through which air flows toward an upper rear side of the passenger compartment.

30. An air conditioner for a vehicle having a dashboard, comprising:
- an air-conditioning case defining an air passage through which air flows into a passenger compartment of the vehicle, the air-conditioning case being disposed inside the dashboard;
- a cooling heat exchanger disposed in the air-conditioning case, for cooling air in the air passage; and
- a drain pipe disposed at a vehicle front lower side of the air-conditioning case, for discharging condensed water generated by the cooling heat exchanger, wherein:
- the drain pipe is inserted into a through hole provided in a partition wall of a frame of the vehicle, defining the passenger compartment, to support the air-conditioning case on a vehicle front side;

the air-conditioning case has a rear air duct through which air flows toward a rear side of the passenger compartment, at a vehicle rear side;

the rear air duct has an attachment piece being fixed to a floorboard of the frame; and the rear air duct is fixed to the floorboard through the attachment piece to support the air-conditioning case on a vehicle rear side.

31. The air conditioner according to claim 30, further comprising a strengthening member, disposed inside the dashboard, for supporting a steering device of the vehicle, wherein a vehicle rear part of the air-conditioning case is supported by the strengthening member.

32. The air conditioner according to claim 30, wherein:

the air-conditioning unit is disposed inside the dashboard at an approximate center position in the vehicle right-left direction; and the air-conditioning case has a fixing portion at a vehicle rear side, for fixing a center cluster in which plural electrical components are integrally gathered.

33. The air conditioner according to claim 32, further comprising:

a bracket fixed to the fixing portion, for fixing the center cluster, wherein:

the bracket has a first connector;

the center cluster has a second connector being engaged with the first connector; and the center cluster is assembled to the bracket so that the second connector of the center cluster engages with the first connector.

34. The air conditioner according to claim 32, wherein:

the rear air duct has right and left rear duct parts through which air flows toward right and left sides on the rear seat side of the passenger compartment; and the fixing portion of the center cluster is provided in the right and left rear duct parts.

35. An air conditioner for a vehicle having a dashboard, comprising:

an air-conditioning case defining an air passage through which air flows into a passenger compartment of the vehicle, the air-conditioning case being disposed inside the dashboard;

a cooling heat exchanger disposed in the air-conditioning case, for cooling air in the air passage; and a drain pipe disposed at a vehicle front lower side of the air-conditioning case, for discharging condensed water generated by the cooling heat exchanger, the drain pipe being engaged with a frame of the vehicle to construct a front load support portion for supporting the air-conditioning case; and a rear load support portion for supporting the air-conditioning case on the vehicle rear side, the rear load support portion being provided at a position different from the front load support portion.

36. The air conditioner according to claim 35, wherein:

the rear load support portion is provided at a position of the air-conditioning case, separated from a bottom surface of the air-conditioning case; and the air-conditioning case is disposed inside the dashboard to form a predetermined space between the bottom surface of the air-conditioning case and a floorboard of the frame.

\* \* \* \* \*